US007181511B1

(12) United States Patent  (10) Patent No.: US 7,181,511 B1
Grenier et al.  (45) Date of Patent: Feb. 20, 2007

(54) SYSTEM AND METHOD FOR USING SOFTWARE OBJECTS TO MANAGE DEVICES CONNECTED TO A NETWORK IN A VEHICLE

(75) Inventors: Alain Henri Grenier, Ann Arbor, MI (US); Kenneth Allen Schmitt, Pinckney, MI (US); Satyanarayana Motheramgari, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 772 days.

(21) Appl. No.: 10/122,475

(22) Filed: Apr. 15, 2002

(51) Int. Cl.
G06F 15/173 (2006.01)
G06F 15/16 (2006.01)
G06F 13/10 (2006.01)
G06F 7/00 (2006.01)

(52) U.S. Cl. ............... 709/223; 709/200; 719/316; 701/36

(58) Field of Classification Search ............ 709/200, 709/223; 715/700; 719/328, 316; 701/36
See application file for complete search history.

(56) References Cited

U.S. PATENT DOCUMENTS

| 3,394,349 | A | * | 7/1968 | Day ........................ 340/3.44 |
| 5,522,042 | A | | 5/1996 | Fee et al. |
| 5,764,915 | A | | 6/1998 | Heimsoth et al. |
| 5,794,164 | A | * | 8/1998 | Beckert et al. ............ 455/3.06 |
| 5,812,771 | A | | 9/1998 | Fee et al. |
| 5,946,694 | A | | 8/1999 | Copeland et al. |
| 5,956,719 | A | | 9/1999 | Kudo et al. |
| 6,032,202 | A | * | 2/2000 | Lea et al. ...................... 710/8 |
| 6,052,750 | A | * | 4/2000 | Lea ............................ 710/72 |
| 6,085,236 | A | * | 7/2000 | Lea ........................... 709/220 |
| 6,148,253 | A | * | 11/2000 | Taguchi et al. ............ 701/48 |
| 6,160,796 | A | * | 12/2000 | Zou ........................... 370/257 |
| 6,175,855 | B1 | | 1/2001 | Reich et al. |
| 6,185,491 | B1 | * | 2/2001 | Gray et al. .................. 701/36 |
| H1964 | H | | 6/2001 | Hoffpauir et al. |
| 6,275,865 | B1 | * | 8/2001 | Zou ........................... 719/313 |
| 6,275,870 | B1 | | 8/2001 | Claar |
| 6,336,128 | B1 | * | 1/2002 | Eisenmann et al. ......... 709/200 |
| 6,349,352 | B1 | * | 2/2002 | Lea ............................ 710/72 |
| 6,377,860 | B1 | * | 4/2002 | Gray et al. .................. 700/83 |
| 6,430,164 | B1 | * | 8/2002 | Jones et al. ................ 370/313 |
| 6,505,100 | B1 | * | 1/2003 | Stuempfle et al. ............ 701/1 |
| 6,654,669 | B2 | * | 11/2003 | Eisenmann et al. ........... 701/1 |
| 6,671,745 | B1 | * | 12/2003 | Mathur et al. .............. 719/328 |
| 6,684,401 | B1 | * | 1/2004 | Zou ............................ 725/80 |
| 6,813,777 | B1 | * | 11/2004 | Weinberger et al. ......... 725/76 |
| 6,901,439 | B1 | * | 5/2005 | Bonasia et al. ............. 709/220 |
| 6,938,258 | B1 | * | 8/2005 | Weinberger et al. ........ 719/312 |
| 2005/0085963 | A1 | * | 4/2005 | Kapolka et al. ............. 701/29 |

* cited by examiner

*Primary Examiner*—Saleh Najjar
*Assistant Examiner*—Vitali Korobov
(74) *Attorney, Agent, or Firm*—Rader, Fishman & Grauer PLLC

(57) ABSTRACT

The invention is the use of a software object as an interface between a device and a network. Both the network and device are located in a vehicle. The system uses a connectivity subsystem that includes a device management object for interfacing between a device and a network in the vehicle. A discovery subsystem identifies which devices are connected to the network by the connectivity subsystem. The control subsystem can then use the device management object to manage the use of the device. In the application layer of the system resides the software applications to be used by the devices and occupants in the vehicle. In the object interface layer of the system resides the software object that connects the network with the various software applications. The network resides in the network layer.

18 Claims, 15 Drawing Sheets

SYSTEM AND METHOD FOR USING SOFTWARE OBJECTS TO MANAGE DEVICES CONNECTED TO A NETWORK IN A VEHICLE

BACKGROUND OF THE INVENTION

The present invention relates generally to the use of software objects to manage network resources. In particular, the invention relates to the use of a device management object as an interface between a device and a network located in a vehicle.

Vehicles are increasingly dependent on the rapid and reliable exchange of data. Computers, computer networks, and various electronic devices are playing an increasing role in vehicles. Vehicles are providing occupants with access to the Internet, satellite and other forms of television, global positioning and other navigational tools, video-on-demand services, satellite radio, CD and DVD players, cellular phones, and an increasing number of other devices and services (collectively "on-board devices" or simply "devices"). Devices are also incorporated into vehicles to support functions intrinsic to the vehicle itself. Examples of such devices include anti-lock braking systems, fuel injection systems, automatic transmissions, and other electronically controlled systems. Devices are also incorporated into vehicles for reasons having nothing to do with the performance of the vehicle or the convenience of an occupant. For example, vehicle tracking devices can facilitate the recovery of a stolen vehicle.

The exact nature of future devices that will be incorporated into vehicles is difficult to determine. However, it is clear that an increasing number of computer programs ("software applications") are and will be needed to support the increasing use of such devices. The ability to meet the increased need for software applications is limited by the architecture used to connect such devices to a network in the vehicle. Different vehicles may incorporate different types of networks with dissimilar operating systems. In the existing art, the computer programmer writing a particular software application requires specific knowledge of the intended operating environment for the particular software application, and the software application that is created is limited to that particular environment. It would be desirable if a device management object could be used as an interface between the software application and the network, rendering the hardware, operating system, and other network details transparent to the software application.

In the existing art, there are inadequate mechanisms for detecting the addition, modification, or removal of devices added to the network in a vehicle. Moreover, it may not be possible to utilize more than one device at a time due to operating system constraints. Temporary communication problems either outside or within the network can require the "rebooting" or restarting of the entire network. It would be desirable for a device management object to provide a more robust and comprehensive interface between a network and the device(s) connected to the network.

SUMMARY OF THE INVENTION

The invention is the use of a software object layer as an interface between a device and a network located in a vehicle.

The system uses a connectivity subsystem that includes a device management object for interfacing a device with a network in the vehicle. A discovery subsystem identifies which devices are connected to the network by the connectivity subsystem. The control subsystem can then use the device management object to manage the use of the device.

In the application layer of the system resides the software application(s) to be used by the device(s) and occupant(s) in the vehicle. In the object interface layer of the system resides the software object that connects the network with the various software applications. In the network layer resides the network.

DESCRIPTION OF THE PREFERRED EMBODIMENT

I. Introduction

Figure 1:
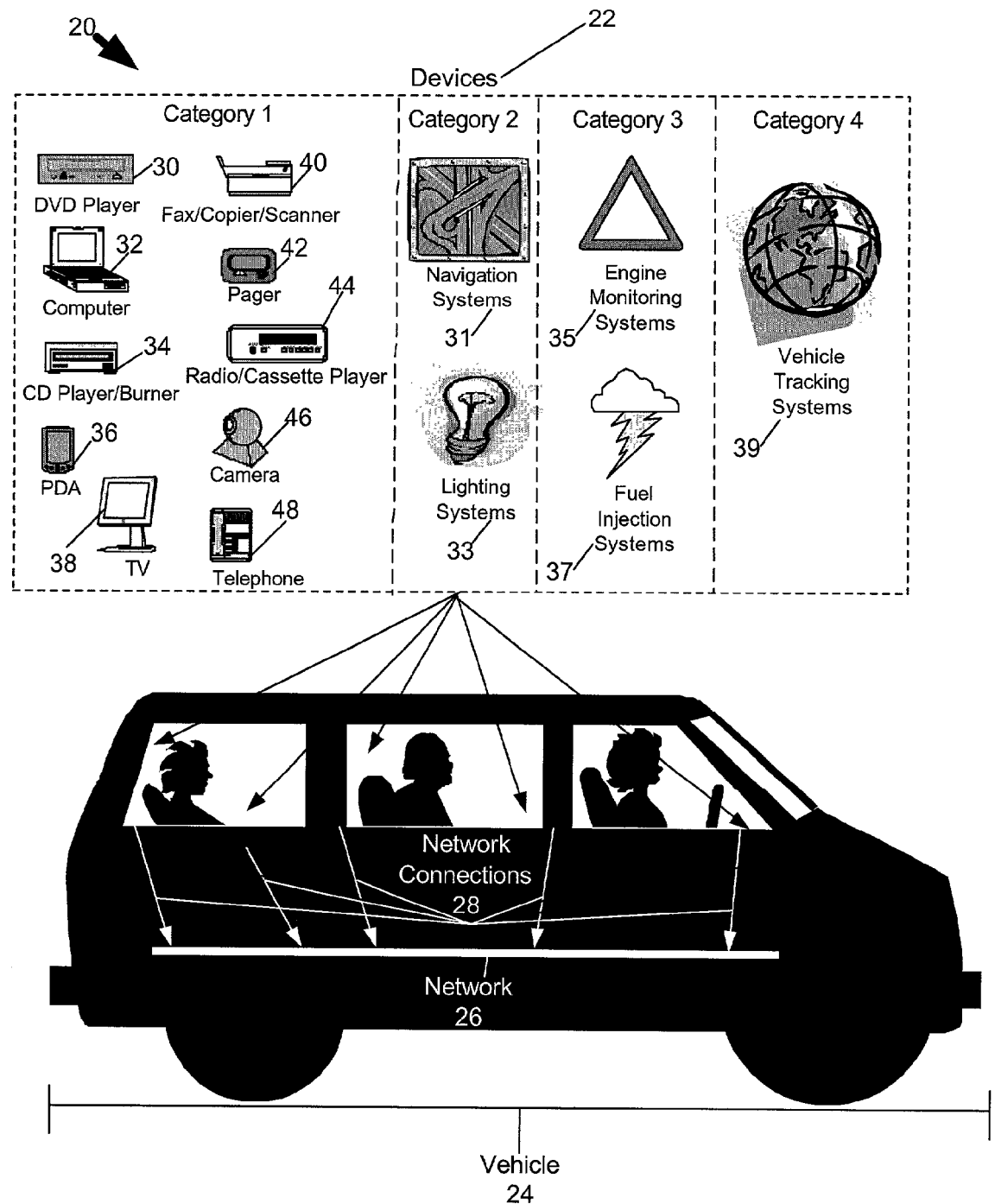
FIG. 1 is a high level environmental view of the invention, illustrating some examples of the types of devices that can be connected to a network in a vehicle.

FIG. 1 is a high-level illustration of a system 20 and method for using a software object interface to manage a device 22 connected to a network 26 in a vehicle 24. A wide range of different categories of devices 22 can be used through a network connection 28 in the vehicle 24.

Devices 22 can be divided up into a wide variety of different categories and types. A single device category can include a number of device types. A single device type can include a number of different devices.

A first category of devices 22 includes those device types, which can be used by an occupant in a vehicle 24 in ways that have little or nothing to do with the operation of the vehicle 24 itself ("occupant devices"). Occupants interact with occupant devices independently of the transportation functions of the vehicle 24. Examples of such device types 22 include a: DVD player 30, computer 32, CD player/recorder 34, personal data assistant ("PDA") 36, television set including a digital and/or a satellite television set (collectively "TV") 38, fax machine, copy machine, scanner 40, pager 42, telephone 48, camera 46, radio/cassette player 44, and many other consumer electronic devices. As explained above single device type can include multiple devices 22. For example, there are many different models of DVD players 30. DVD players 30 are a device type, but the system 20 can incorporate multiple devices 22 of the same type connected at the same time. The system 20 can incorporate the connecting multiple non-identical and even materially different devices of the same device type at the same time.

A second category of devices 22 includes devices 22 that are used by the occupant in conjunction with the use of the vehicle 24 ("occupant-assisting devices"). Occupants can use occupant-assisting devices to enhance the ability of the occupant to use the vehicle 24. Climate control, night vision, lighting systems 33, and global positioning/navigational systems 31 are examples of such device types. A third category of devices 22 includes devices that are used by the vehicle 24 to perform functions that relate to the functions of the vehicle 24 ("core vehicle devices"). Core vehicle devices do not require interaction with an occupant of the vehicle 24. Anti-locking braking systems, fuel injection systems 37, automatic transmissions, and engine monitoring systems 35 are examples of such device types. Devices 22 in this third category are often transparent to the driver or occupant of the vehicle 22. A fourth category of devices 22 includes any other type device 22 capable of being connected to a network 26 in a vehicle 24 that does not fit in one of the first three categories ("miscellaneous devices"). Miscellaneous devices are geared to purposes not relating to the functioning of the vehicle 24 or for the benefit of the occupants of the vehicle 24. Vehicle tracking systems 39 that facilitate the location and return of stolen vehicles are one example of such devices 22. The system 20 incorporates an architecture that can support future improvements of existing devices 22 and entirely new types of devices 22. In a preferred embodiment of the system 20, safety devices 22 are not incorporated into the system 20, and are not connected to the network 26.

The system 20 can incorporate a wide range of different vehicles 24. Vehicles 24 can include ground transportation mechanisms such as cars, trucks, motorcycles, jeeps, mopeds, bicycles, sport utility vehicles ("SUVs"), tanks, lawn mowers, golf carts, and any other type of ground transportation mechanism capable of incorporating a computer network 26 with one or more devices 22. Vehicles 24 can also include other transportation mechanisms such as boats, trains, planes, space capsules, space stations, satellites, submarines, helicopters, satellites, and any other type of transportation mechanism utilizing a computer network 26 connecting one or more devices 22.

The system 20 can incorporate a wide range of different network architectures and operating systems. The network 26 should preferably be able to process high data volumes in a secure and reliable manner. In a preferred embodiment of the system 20, the network 26 is a high bandwidth network 26 that utilizes plastic optical fiber ("POF"), such as a MOST® network. MOST® is a registered trademark of Oasis, a company with offices in Austin, Tex. MOST® stands for Media Oriented Systems Transport. MOST® networks are the result of a consortium of automotive manufacturers and suppliers. MOST® networks 26 use plastic optical fiber to combine the advantages of high bandwidth, insensitivity to electromagnetic interference, and lower weight in relationship to copper-based technology. Alternative embodiments can incorporate a wide range of different networks 26, of varying bandwidth, sensitivity to electromagnetic interference, weight, cost, and other characteristics. A preferred topological structure of the network 26 is a ring, but alternative embodiments can incorporate different topological structures.

In addition to the environmental and structural concerns mentioned above, such as weight, electromagnetic sensitivity, the significant wear and tear that a vehicle 24 and its components are subjected to, networks 26 in vehicles 24 also face a unique set of architectural challenges that are not faced in computer networks 26 in "general purpose" computing environments. For example, the internal processes of computers and networks in vehicles are typically less accessible via data entry mechanisms such as keyboards, mice, voice recognition technology, laser pens, and other data entry mechanisms. Many, if not all, of the internal processes in an onboard vehicle network 26 cannot be accessed by such data entry mechanisms. In a preferred embodiment, the network 26 (an "embedded network") is without any occupant data entry mechanisms. The lack of a direct means for an occupant of a vehicle 24 to interact directly with internal processes of the network 26 requires performance and quality beyond those required for "general purpose" networks. If a problem occurs in a "general purpose" network, a network administrator is available on site to fix the problem by reloading software, installing patches, etc. If a problem occurs in an onboard network 26 in a vehicle, there is likely no network administrator in the vehicle 24, and even if there was, that person would not be able to directly access many of the internal processes of the network 26.

Computers and networks 26 in vehicles typically have significant memory and processing power constraints in contrast to "general purpose" computers and networks. The computers and networks 26 that are found in vehicles 24 exist for a very specific (albeit growing) list of purposes. The embedded computers found in vehicles 24 are provided just enough memory to serve their respective specific functions. Since users cannot add software to an onboard computer (except potentially by adding devices 22 to the vehicle 24), there is every incentive to minimize the memory available on an onboard computer or network 26. Moreover, a typical desktop computer or network server can facilitate centralized processing where additional processing power and memory can take on additional tasks. Embedded computers in vehicles 24 are typically decentralized, with less ability to spread costs over a broader range of applications. Thus, the interface used by the system 20 faces significantly greater memory constraints compared to the operating environments of "general purpose" networks.

Networks 26 in vehicles 24 have a broader range of devices 22 to support than a "general purpose" computer or network. The system 20 needs to prioritize the allocation of network 26 resources from entirely different categories of devices 22. "General purpose" computers and networks are not charged with allocating network resources between climate control systems, fuel injection systems, global positioning systems, and a DVD player. The system 20 can prioritize each device 22 and category of devices in an appropriate manner. In a preferred embodiment, the system 20 provides uniform treatment to all devices in the same device category. In alternative embodiments, all devices can be treated equally, even if those devices belong to different device categories or are of different device types.

The system 20 uses a device management object as an interface between the devices 22 and the network 26. Different networks 26 can have different hardware, software (such as operating systems and device drivers), and other attributes. Such distinctions generally exist in the "low-level" software that is often machine or environment dependent. Use of the device management object by the system 20 allows the software applications for the devices 22 to be developed without regard to the specific "low level" attributes of a particular network environment (the "network" 26). The system 20 hides or renders "transparent," the "low level" attributes of the network 26 from the software application and the computer programmer(s) developing the application software. This facilitates the creation of more software applications for a broader range of networks 26 and vehicles 24.

The system 20 also provides what is known in the art of general purpose desktop computers as "plug and play" functionality. Changes in the number or types of devices 22 connected to the network 26 are automatically detected by the system 20. Through the use of the device management object, the system 20 detects the addition, removal, or modification of devices 22 connected to the network 26, and the device management object can then make the corresponding adjustments to permit the new environment of devices 22 to function properly. The system 20 can run multiple devices 22 on the same network 26 and operating system at substantially the same time (e.g., multiple devices can perform processing in a substantially simultaneous manner). If there is a transmission problem from the network 26 to one of the devices 22 on the network 26 that does not involve the actual failure of the network 26 itself, the system 20 can use the device management object to facilitate automatic recovery between the device 22 and network 26.

II. Subsystems View

Figure 2:
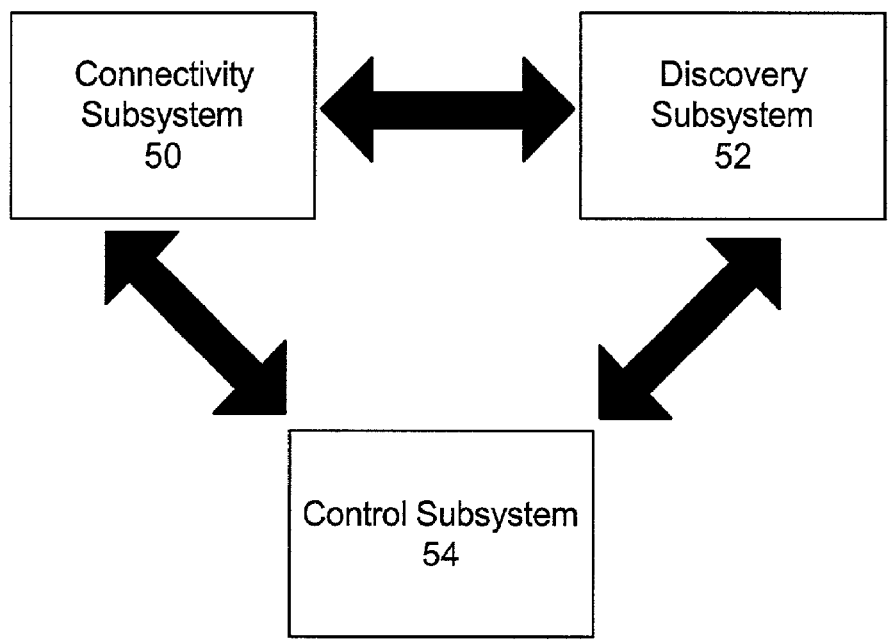
FIG. 2 is a block diagram disclosing the connectivity subsystem, the discovery subsystem, and the control subsystem.

FIG. 2 is block diagram illustrating three subsystems that can be used by the system 20. Each subsystem interacts directly with the two other subsystems. A connectivity subsystem 50 includes a software object that can be referred to as a device management object. The device management object serves as an interface between the network 26 and the device 22. The connectivity subsystem 50 can be activated by simply plugging in one of the devices 22 into one of the network connections 28 on the vehicle 24. The connectivity subsystem 50 can automatically create a connection between the device 22 and the network 26 using the device management object. The connectivity subsystem 50 allows the system 20 to send and receive messages to and from network devices 22, without having to be familiar with the "low level" attributes of the network 26.

A discovery subsystem 52 is used by the system 20 to identify devices 22 that have been connected to the network 26 by the connectivity subsystem 50. The discovery subsystem 52 is responsible for discovering when a device 22 has been removed from the network 26, when a device 22 has been added to the network 26, and when a device 22 on the network 26 has been modified in a material way. The discovery subsystem 52 identifies devices 22 connected to the network 26 using the device management object. The discovery subsystem 52 can use the device management object to utilize the appropriate device drivers and other "low-level" configuration support required for the discovered device. The discovery subsystem 52 allows the system 20 to retrieve the list of devices 22 currently available on the network 26, and the capabilities of those devices.

A control subsystem 54 uses the connection established by the connectivity subsystem 50, the identification information obtained by the discovery subsystem 52, and the device management object, to "manage" the device 22 connected to the network 26. The managing of devices 22 on the network 26 includes management of the software applications used by the devices 22 in the system 20, communications between one component of the system 20 to another component of the system 20, user processes initiated by device 22, and any other aspect of the relationship between the device 22 connected to the network 26 in the vehicle 22. The control subsystem 54 allows the system 20 to send control commands to the available network devices 22 and to route video and audio channels to the proper output devices 22 on the network 26. The routing capabilities include the routing of any local audio source to any output device 22 on the network 26.

III. Layers

Figure 3:
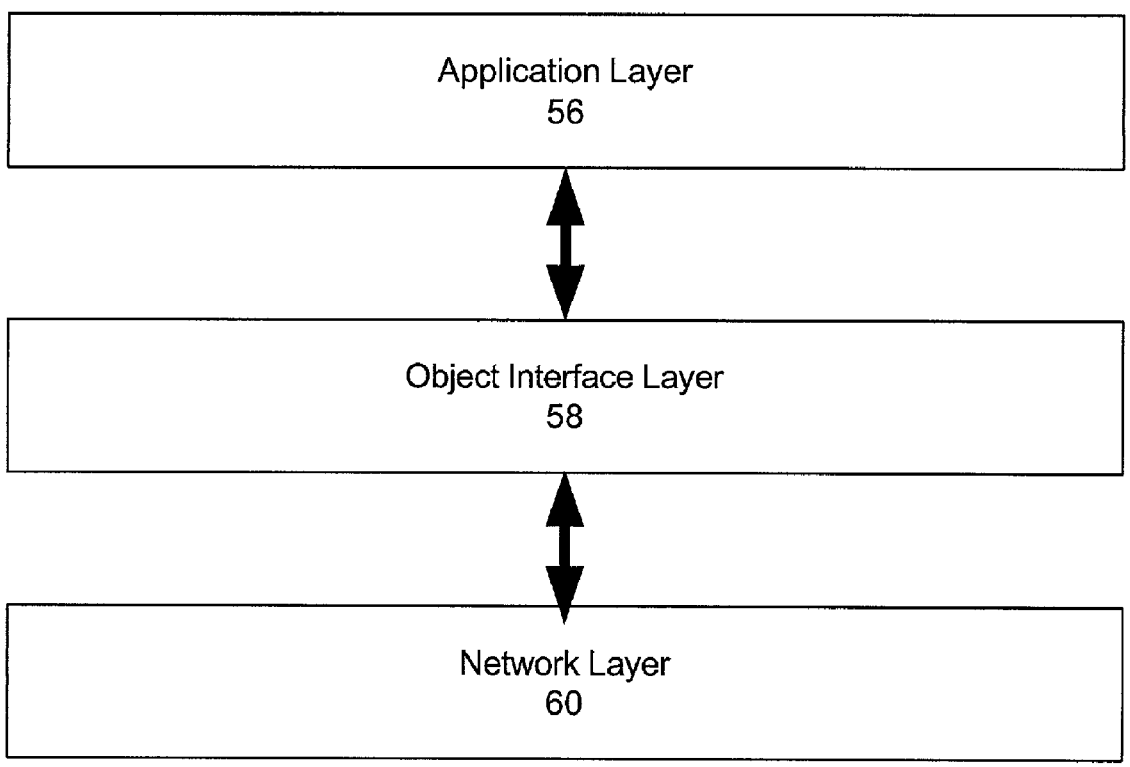
FIG. 3 is a block diagram disclosing the application layer, the object interface layer, and the network layer.

FIG. 3 is a block diagram illustrating the three layers that are used by the system 20. An application layer 56 includes the computer programs ("application software" or "software applications") used in the various devices 22 and created by the various user processes. Application software in the application layer 56 can be used to facilitate the various functions of the various devices 22. For example, one of the functions (e.g., user processes) of a facsimile is to "send a fax." Application software in the application layer 56 incorporating the functionality to "send a fax" can be used in conjunction with the system 20, which includes the device 22 (a fax machine), the network 26, and the network connection 28 between the device 22 and network 26. The application layer or level 56 incorporates "high level" software code, in contrast to the "low level" software code found in the network 26. "High level" software code is not machine or environment dependent. "High level" software code includes the logic of what the software application or device 22 is to do, and is not typically concerned with how the "low level" software code is used to facilitate the objectives and processing of the "high level" software code.

A network layer 60 includes the network 26 and the network connections 24 connected to the network 26. The network layer 60 contains various device drivers required to allow the devices 22 to connect, interact, and function with the network 26. The network layer 60 also includes at least one operating system utilized by the network 26.

Figure 4:
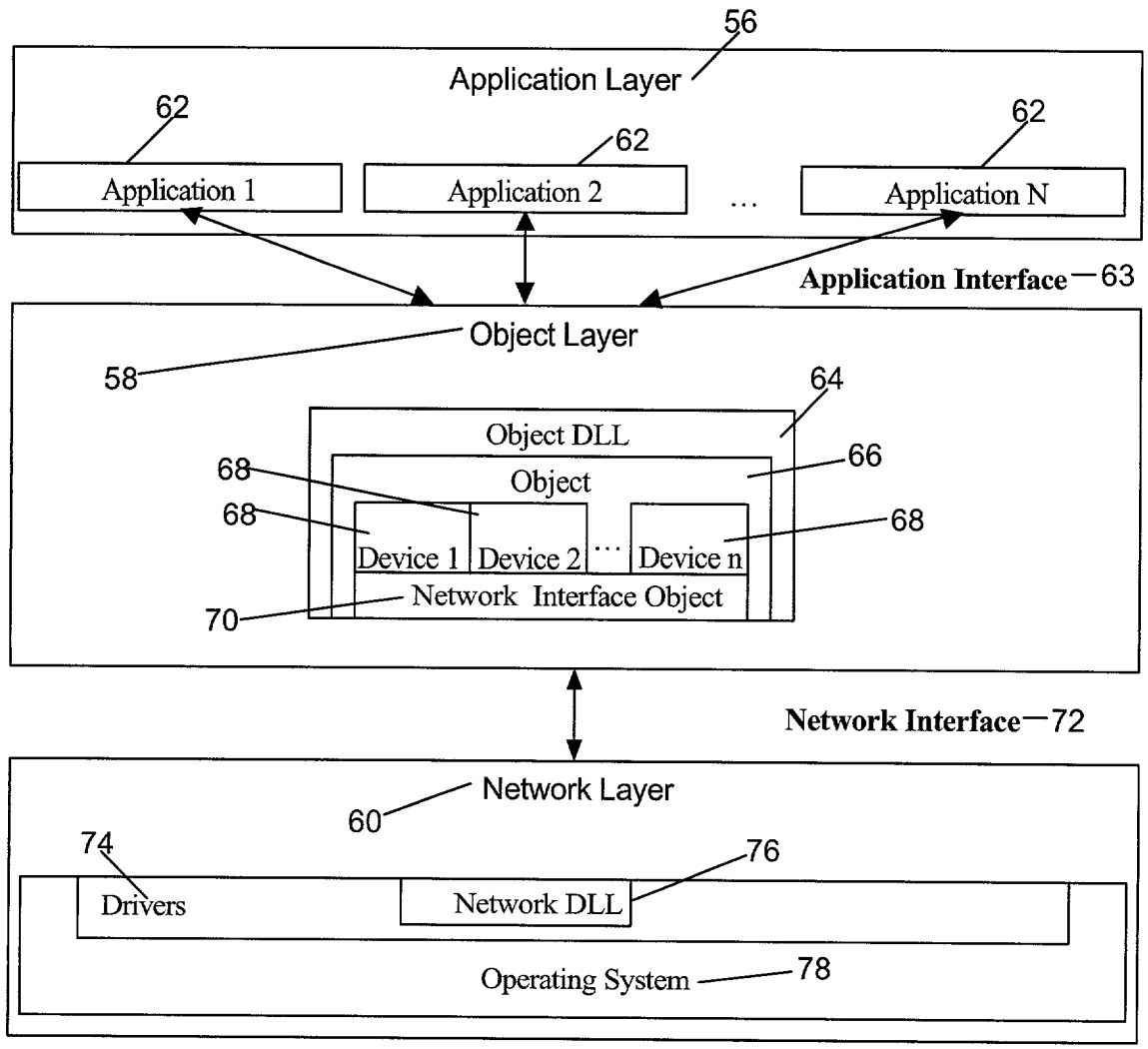
FIG. 4 is a more detailed illustration of the application layer, the object interface layer, and the network layer, an illustration that includes exemplary components contained in the various layers, and exemplary communications and interfaces between the various layers.

FIG. 4 is a more detailed illustration of the three layers, including exemplary components of the various layers, and their various interactions. The system 20 can possess a wide range of different embodiments, and is not limited to the specific structure set forth in the Figure.

The application layer 56 can have one or more software applications 62. Each device 22 may require the use of one or more software applications 62 in the application layer 56. Thus, the more devices 22 that are connected to the network 26, the greater the number of software applications 62 in the application layer 56. The number of software applications 62 that can be contained in application layer 56 is limited solely by the storage capabilities of the system 20. The system 20 can have between 1 and N software applications 62.

An application interface 63 connects the application layer 56 and all of the software applications 62 to the object layer 58. The system 20 allows computer programmers writing software applications 62 to create software applications for a particular application interface 63 (an interface utilizing "high level" code), instead of a particular network interface 72 (an interface requiring "low level" code). A single application interface 63 can support numerous different network 26 configurations and numerous different network interfaces 72. Moreover, some network interfaces 72 and operating systems are built with proprietary technology that cannot be widely disseminated. In those embodiments, use of the application interface 63 makes it possible for computer programmers without access to the proprietary technology to create software applications 62 for the system 20. The application interface 63 allows any software application 62 or device 22 to access any device 22 on the network 26 using the appropriate representative agent hosted with an object DLL ("dynamic link library") 64.

The object interface layer ("object layer") 58 is connected to the application layer 56 through the application interface 63. The object layer 58 is illustrated with the object DIL 64, which includes a software object 66 (the "device management object," the "DM object" or simply the "object"). The object dynamic link library 64 is composed of stored reusable functions, processes, objects, and other software that can be used by the device management object 66 to facilitate the function of the device management object 66 as the interface between the network layer 60 and the application layer 56. By storing commonly used functions only once in a library of computer code, the memory consumption of those functions is reduced. The object DLL 64 contains a library of functions utilized by the object layer 58, including files needed by the device management object 66. The object DLL 64 should notify an application 62 when changes occur on the network 26 that could impact the application 62. Such changes can include device 22 data changes and the occurrence of errors. Upon the request of an application 62, the object DLL 64 can supply a list of all available network 26 devices 22. The object DLL 64 can automatically identify each network connection 28 or "node" as an input or output device 22. In a preferred embodiment, the object DLL 64 can automatically determine the capabilities of each identified network node 28 in terms of available control functionality (e.g., volume control, input selection, type of output mode, etc.). The object DLL 64 should preferably be able to read a configuration data store ("shared data" described in greater detail below) and initialize and/or configure the appropriate network devices 22 according to the configuration of the shared data. Multiple applications 62 can be given access to the same shared data. The object DLL 64 should behave as an auxiliary input function block for the network 26. The object DLL 64 is loaded only once by the first software application 62 or device 22, and can be used by any subsequent software application 62 or device 22 requiring access to the network 26. The object DLL 64, including the device management object 66, can be destroyed (erased from memory) when all devices 22 are removed from the network or shut down.

The device management object 66 is cognizant of the "low level" requirements and processes of the network layer 60 and the network interface 72 so that the application interface 63, application layer 56, and the computer programmers writing application software 62 do not need to be cognizant of such "low level" requirements and processing. In object-oriented software design, an "object" is an abstract data type that has state (or mode), behavior, and identity characteristics. Object-oriented designs incorporate the principles of abstraction, encapsulation, modularity, hierarchy, typing, concurrency, and persistence.

In a preferred embodiment, the device management object 66 includes other "objects." For each device 22 connected to the network 26, the device management object 66 can include a surrogate device object 68 ("surrogate object," "device object," or "surrogate network device object"). The device management object 66 can also include a network interface object 70. The network interface object 70 handles data and processing that is common to interfacing with the network interface 72, regardless of the device 22 or software application 62. The surrogate device objects 68 handle data and processing that is particular to the type of device 22 being interfaced by the device management object 66. In such an embodiment, the device management object 66 can focus on the handling of data and processing that is common to interfacing with the application interface 63, while the surrogate objects 68 process the device-specific or software application-specific functionality. In a preferred embodiment of the system 20, the object DLL 64 and surrogate objects 68 do not load device driver modules that are specific to any of the discovered network devices 22.

As discussed above, the network interface 72 is the interface used to interact with the network layer 60 from the object layer 58. The network interface 72 is the access point of the connectivity subsystem 50, discovery subsystem 52, and control subsystem 54 to the network layer 60.

In a preferred embodiment of the system 20, the network layer 60 contains a device driver 74 for each of the devices 22 connected to the network 26. Those device drivers 74 interact with the surrogate objects 68 described above. Whatever network drivers 74 are required for the system 20 to operate are included in the network layer 60. A preferred embodiment also includes a network DLL 76, a library of reusable functions, processes, objects, and other software components relating the processing performed in the network layer 60. The network layer 60 also includes at least one, and potentially multiple different operating systems 78.

Figure 5:
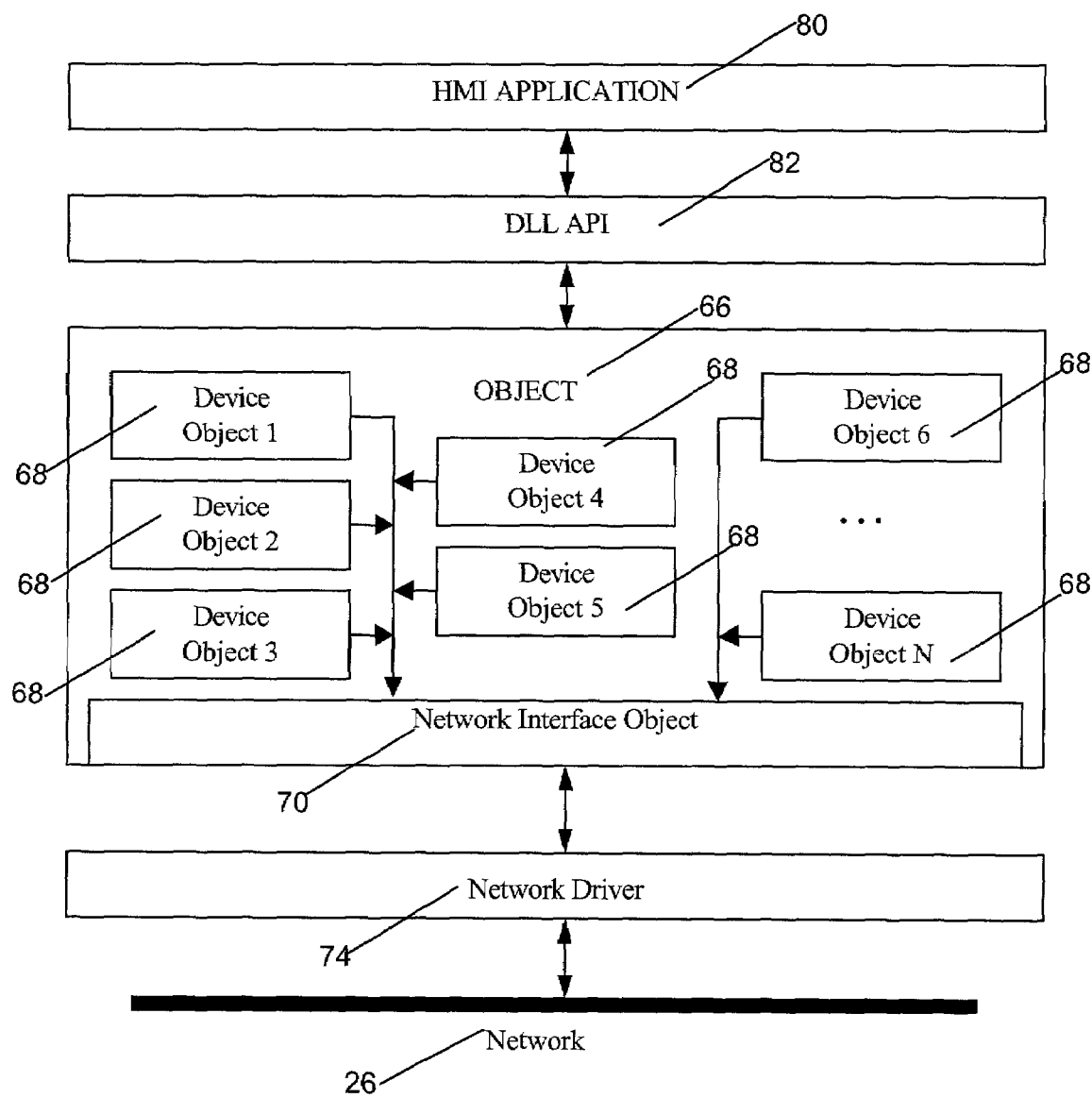
FIG. 5 is a block diagram illustrating how various components of the system can interact and invoke other components of the system.

FIG. 5 discloses a different view of the various layers and components illustrating the order in which information and data can be processed. The system 20 is flexible, and may be incorporated in embodiments differing substantially from the exemplary disclosure illustrated in the Figure.

At the top of the diagram is an HMI application 80. HMI means human-machine interface, and the HMI represents the boundary at which a human being can make contact with the system 20 by interacting with the various devices 22 connected to the network 26, resulting in the invocation of software applications 62 in the application layer 56.

The HMI application 80 interacts with a DLL via the API ("DLL API" 82). API means application programming interface, and it is part of the application interface 63 described above. The API DLL 80 is a library of reusable functions, objects, processes, and other software used to support the application interface 63.

The device management object 66 interfaces with the DLL API 82. The device management object 66 provides a middle ground between "high level" application layer 56 processing, and "low level" network layer 60 functions. As discussed above, the device management object 66 should include a surrogate device object 68 for each of the devices 22 connected to the network 26. The drivers for those devices 22 can be included in the corresponding surrogate device object 68. The surrogate device objects 68 can interface with the network interface object, discussed above. The network interface object 70 should be configured to handle all processing and information that is common to any invocation of the network 26, although the device 22 specific and application 62 specific processing and information is handled by the appropriate surrogate object 68.

Connecting the network interface object 70 to the network 26 is the network driver 74. Network drivers 74 support the functionality of the various cables, servers, and other apparatus that make up the network 26.

IV. Control Flow Design

Figure 6:
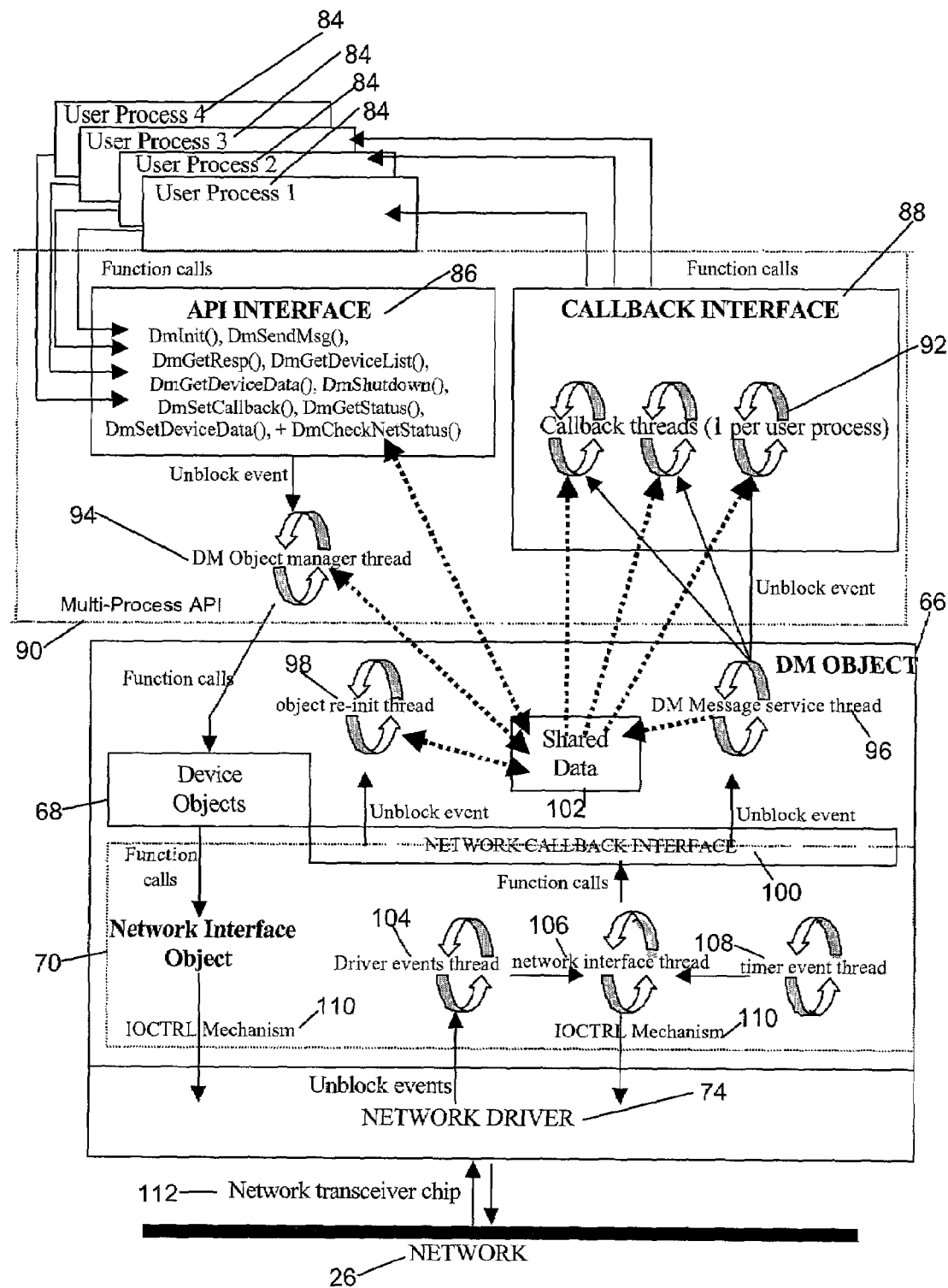
FIG. 6 is process diagram illustrating many of the components and processes that can be used by select embodiments of the system.

FIG. 6 is a detailed illustration of some of the inter-layer and intra-layer communications and processes that can be incorporated into the system 20. The system 20 is flexible, and can incorporate processes, communications, and functions that are substantially different from the exemplary ones disclosed in the figure.

Through the HMI application 80, a user process 84 can be triggered. A user process 84 can be any process triggered from outside the system 20. In cases of devices 22 that exist in a vehicle for the purpose of vehicle functions (third category of devices 22), the "user" process 84 may be triggered by another system in the vehicle 24 or by an event taking place outside the vehicle 24. Examples of user processes 84 can include plugging in a DVD player 30 into a network connection 28 in the vehicle, pressing a button in a satellite TV to access a pay-per-view movie, the request by an occupant for directions to a certain destination from the current location of the vehicle 24, or any other use, function, or change in a device 22 connected to the network 26 in the vehicle 24.

User processes 84 trigger function calls in an API Interface ("Application Program Interface") 86. The API interface 86 is composed of the functions in the object DLL 64, in addition to functions relating to the devices 22 themselves. In a preferred embodiment, the API Interface 86 has at least the following ten functions related to the object layer 58.

1. An initialization function that can be called DmInit( ) should be used for device management initialization. Each user process 84 must call this function to register with the object DLL 64. The first call to this function loads the object DILL 64, which includes the device management object 66. The first call also initializes access to the network 26. It may take from a few seconds up to about thirty seconds (a minute in extreme cases) to complete the network 26 initialization, depending on the nature and number of devices 22 on the network 26. This function can return a variety of completion codes. NETWORK_AVAILABLE is the successful completion code. No data structure is associated with this API function.

2. A get status function can be called DmGetStatus( ). This function can be called at any time after the DmInit( ) call completes, whether that function was successful or not. The status information obtained can be copied into a status data structure (DM_STATUS) by the function. DM_STATUS includes a description of the current status of the object layer interface 58 to the network 26, and the number of devices 22 currently available on the network 26.

3. A get device list function can be called DmGetDeviceList( ). This function can be called at any time after the DmInit( ) function completes successfully. This function returns the number of devices 22 currently available on the network 26, or a zero in the case of an error. The information can be copied into an array of device information data structures (DM_DEV_INFO), which include, for each device 22, the current status of the device 22 and a description of the device 22.

4. A set callback function can be called DmSetCallback( ). This function can be called at any time after the DmInit( ) function completes successfully, and is used to register a callback function with the object DLL 64. Callback functions and processing are described in greater detail below. A callback setup data structure (DM_CB_SETUP) can be passed as a parameter to this function. This function can used to describe the callback function and the conditions under which it is to be called by the API Interface 86. This function can return a variety of completion codes, with NETWORK_SUCCESS representing a successful completion of the function.

5. A send message function can be called DmSendMsg( ). This function can be called at any time after the DmInit( ) function completes successfully. It can be used to send control messages to a selected device 22 on the network 26. Control messages can be categorized as one of at least two types: configuration control messages and command control messages. Control messages can be specified in a message data structure called DM_MSG, that is passed to DmSendMsg( ) as a parameter. This function can return a variety of different completion codes, with NETWORK_SUCCESS indicating a successful completion.

6. A get response function can be called DmGetResp( ). This function can be called at any time after the DmInit( ) call completes successfully and at least one message is successfully sent to a device 22. This function can be used to retrieve the response to a previously sent message that either timed out or that was sent using the asynchronous mode of the DmSendMsg( ) function. This function returns a variety of different completion codes, with NETWORK_SUCCESS representing successful completion.

7. A get device data function can be called DmGetDeviceData( ). This function can be called at any time after the DmInit( ) function completes successfully, and when at least one device 22 is available on the network 26. The requested data is copied in a device information data structure (DM_DEV_DATA) so long as the data size passed to the DmGetDeviceData( ) function as a parameter is successfully validated. This function returns a variety of different of completion codes, with NETWORK_SUCCESS indicating a successful completion.

8. A set device function can be called DmSetDeviceData( ). This function can be called at any time after the DmInit( ) function completes successfully and there is at least one device 22 available on the network 26. The data passed to the device information data structure (DM_DEV_DATA) is specific to a particular device 22. This function returns a variety of completion codes, with a NETWORK_SUCCESS response representing a successful completion of the function.

9. A check network status function can be called DmCheckNetStatus( ). This function can be called at any time after the DmInit( ) call completes successfully, and is typically used by a user process 84 or software application 62 to implement either passive or active recovery strategies in case of network 26 failures or instability. This function can monitor the status of the network 26 for a period of time (preferably predetermined) that is specified by the user process 84 or software application 62, when the object DLL 64 is in a degraded mode. The degraded mode is described below. The function returns a NETWORK_AVAILABLE as soon as the network 26 is available again, or NETWORK_ERROR when the timeout expires without a network 26 recovery.

10. A shutdown function can be called DmShutdown( ). This function can be called at any time after the DmInit( ) call completes successfully, and should be called before the user process 84 or software application 62 stops execution to deregister from the object DLL 64. If not called by the user process 84 or software application 62, the object DLL 64 automatically detects and deregisters the existing user process 84 or software application 62. This function can return a variety of different completion codes, with NETWORK_SUCCESS indicating the successful completion of the function.

The functions are described in greater detail below. In alternative embodiments, additional functions can be added, certain functions can be combined with other functions, functions can be modified, or functions can also be removed from the system 20.

Returning to FIG. 6, the API interface 86 is part of a multi-process API 90, which means that the system 20 can perform multiple processes at the same time or roughly the same time (e.g., in a simultaneous or substantially simultaneous manner). The API interface 86 contains functions that are available to all user processes 84 and software applications 62. The API interface 86 funnels requests for network 26 access to the interface object layer 58 via a DM object manager thread 94. A thread is a computer programming or software process that is part of a larger process. The threads incorporated into the system 20 typically involve the transmission of data or "messages" to other parts of the system 20. The disclosure in FIG. 6 illustrates how processing begins with a user process 84 or software application 62, looping through the various layers in the system 20, ending back with a callback interface 88 interacting with the user process 84 or software application 62.

In a preferred embodiment of the system 20, no direct access to the device management object 66 is provided to the API interface 86. Access is limited to the multi-process thread 94. The multi-process API 90 preferably includes the callback interface 88, a mechanism by which the network 26 and system 20 can respond to user processes 84 and processing invoked by software applications 62. The callback interface 88 includes one or more callback threads 92. The process flow in the Figure begins with user processes 84 and software applications 62 triggering functions in the API interface 86, and that same process flow can end with the callback threads 92 in the callback interface 88 sending information back to the various user processes 84 and software applications 62.

The API interface 86 automatically discovers devices 22 attached to a network connection 28, and controls those devices 22. Unlike "general purpose" computer systems which typically involve a specific API for each type and model of device, a preferred embodiment of the system 20 uses only one API interface (application program interface) 86. In a preferred embodiment, the goal of the API interface 86 is to treat devices in the same device category in a uniform manner. For example, the system 20 encapsulates the differences between devices (or at least device categories), so that the same interface treatment can be provided to each device. Encapsulation is a term in object oriented software design that relates to hiding "low level" detail information relating to a device 22. The API interface 86 does not target specific devices or device types in a preferred embodiment of the system 20. The API interface 86 allows software applications 62 to discover the capabilities of each device on the network 26 and to adapt to these capabilities. For example, two CD players 34 may not support the same set of commands, and yet both can be incorporated by the system 20. This is in contrast to "general purpose" computer systems, which typically require all CD players to support the exact same set of commands.

The API interface 86 funnels thread synchronization objects for callback purposes via the DM object manager thread 94. Callback thread synchronization objects must be acquired in the multi-process interface thread context. The API interface 86 handles directly all requests for accessing all shared data 102 in the device management object 66. In a preferred embodiment, the shared data 102 can be found in a single data structure in the device management object 66. In alternative embodiments, multiple data structures can be used in the device management object 66 to store the shared data 102. User processes 84 and software applications 62 are automatically notified of network 26 events exclusively through the callback interface 88.

The callback interface 88 is started the first time a user process 84 or software application 62 registers a callback function with the API interface 86. The callback interface 88 preferably includes one thread per user process 84 or software application 62 calling all of the appropriate registered callback functions for the user process 84 or software application 62 that created the thread. Callback thread synchronization objects are preferably created by the process that creates the callback thread, and acquired by the device management object 66 in the context of the multi-process interface thread.

Beneath the API interface 86 and callback interface 88 blocks, and elsewhere in the Figure, the notation of "unblock event" is disclosed. Some embodiments of the system 20 may function in a non-blocking state, where the DmSendMsg( ) function returns immediately after passing a message. In other embodiments, the system 20 functions in a blocking state, where the DmSendMsg( ) function does not return until after the device 22 response is received or the network request times out or expires. Blocking can be preferable, but blocking embodiments put more strain on a network 26. Where network performance 26 is being strained, non-blocking embodiments are preferred. In the case of the device 22 response being received, the response data may be included in the original message structure. The "unblock events" illustrated in the Figure represent where the system 20 will wait for an unblock event before triggering a callback. Blocking and unblocking can serve as a "traffic cop" for communications illustrated in the Figure, but alternative embodiments of the system 20 do not require blocking and unblocking events.

The DM object manager thread 94 uses function calls to communicate with the device objects 68 (also called surrogate objects 68 or surrogate device objects 68) described above. The DM object manager thread 94 can read, add, update, and delete information contained in the shared data 102. The device objects 68 can communicate with function calls to the network interface object 70, described above. The functions in the API interface 86 can automatically realize that "low level" information needs to be processed by the surrogate device objects 68. The various functions trigger an appropriate response in whatever object they are invoked on. The network interface object 70 is the part of the object interface layer 58 responsible for communicating to the network layer 60 through a IOCTRL (input/out control) mechanism 110. The IOCTRL mechanism 110 communicates with the network driver 74, which communicates to the network 26 through a network transceiver chip 112. The network 26 communicates back to the network driver 74 through the network transceiver chip 112.

A network callback interface 100 funnels communication between the network interface object 70 and the device management object 66 in a manner similar to the functioning of the callback interface 88 in the multi-process API 90 that funnels responses to user processes 84 and software applications from lower regions in the system 20. The function calls sent to the network callback interface 100 from the interface thread 106 can be the same functions as are located in the API Interface 86. The functions in the API interface 86 can automatically realize that "low level" information needs to be processed. The various functions trigger an appropriate response in whatever object they are invoked on.

The network interface object 70 communicates with the network callback interface 100 through an interface thread 106. A driver events thread 104 and a timer event thread 108 feed information to the interface thread 106, and generally interact with the interface thread 106. The interface thread 106 can send information through the IOCTRL mechanism 110 to the network driver 74. The interface thread 106 communicates to the network callback interface 100 through function calls.

The upper region of the device management object 66 includes the shared data as well as an object re-initialization thread 98 and a message service thread 96. The network callback interface 100 interacts with the shared data 102 only in an indirect manner, through an object re-initialization thread 98 and a message service thread 96. The shared data 102 provides the system 20 with efficiencies by eliminating the redundant storage of information, and by keeping all information relating to the device management object 66 (and the object interface layer 58) in a single location.

The object re-initialization thread 98 serves to re-initialize objects as the result of changes in the shared data 102 or in other network 26 communications passed through by the network callback interface 100. The message service thread 96 receives information from the network callback interface 100, and passes that information through to the appropriate callback thread 92, and if necessary, to the shared data 102. As described above, the callback threads 92 are responsible for all communications back to the user processes 84 and software applications 62.

The illustration in FIG. 6 represents numerous different embodiments because the various threads and functions can be implemented in numerous different ways. Moreover, the subsystem structure of FIG. 2 and the layer structure of FIG. 3 can also be incorporated into numerous different control flow designs, many such embodiments differing in material ways from the control flow design illustrated in FIG. 6, without compromising the inventive concepts contained herein.

V. Operational Modes

Figure 7:
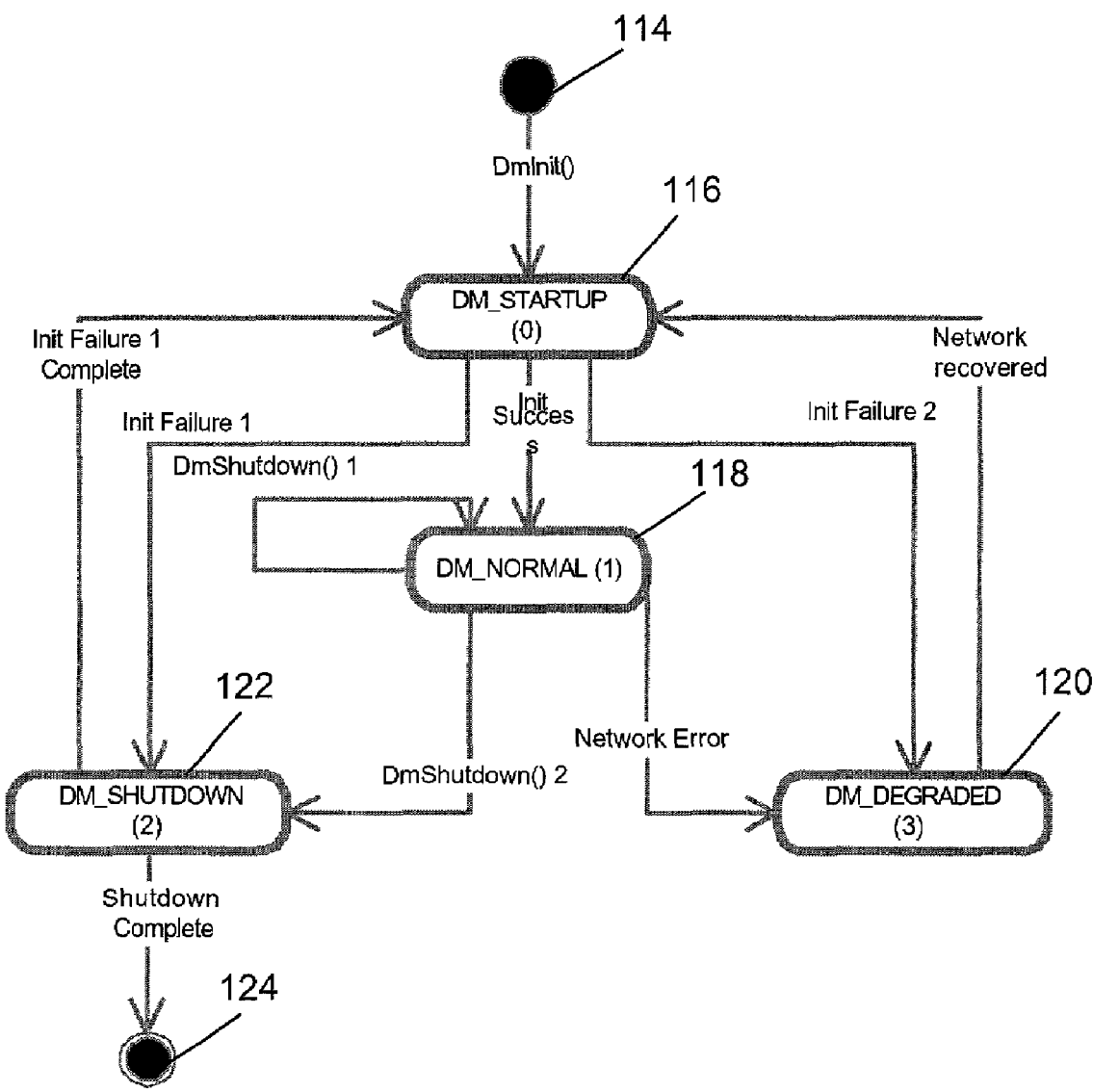
FIG. 7 is a mode (or state) diagram, illustrating how the system can transition from one mode to another mode, and exemplary functions related to those transitions.

The device management object 66 is preferably designed to run in four modes. Alternative embodiments can include a fewer number of modes, a greater number of modes, or different types of modes. FIG. 7 discloses a block diagram of a four mode embodiment, and the transitions between the various modes.

A DmInit( ) function 114 is an API function that is called by the software application 62 or device 22, which triggers the loading of the object DLL 64. The function is used to initialize the device management object 66. The function triggers a startup mode (DM_STARTUP) 116. This mode is the default mode for the device management object 66 at instantiation time. Instantiation time is the time in which the device management object 66, the object DLL 64, and other components of the object interface layer 58 are created in memory by the system 20. Instantiation creates objects in memory from what object oriented programming refers to as classes of objects. The object initialization functionality needs to complete successfully before the object transitions to the next mode listed below. In case of initialization failure, the device management object 66 can remain in this mode. The object status data can be retrieved at any time by the software application 62 so that object maintenance can be performed. When the object initialization functionality is requested, the device management object 66 initializes the connectivity subsystem 50, and initializes the discovery subsystem 52 by retrieving the network 26 configuration and all pertinent network device 22 information (device name, capabilities, specific channel configuration, etc.). In this mode, the control subsystem 54 is not available to a software application 62.

A successful completion of the initialization process performed in the startup mode 116 transitions the system 20 to a normal mode (DM_NORMAL) 118. Initialization failures can result in a transition to either a shutdown mode (DM_SHUTDOWN) 122 or a degraded mode (DM_DEGRADED), depending on the nature of the error. An Init Failure 1 result indicates that the DmInit( ) function call failed before the attempt at network 26 initialization (a "lethal failure"). The mode is transitioned to shutdown (DM_SHUTDOWN) 122 in order to allow for resource cleanup. After resource cleanup is performed, the system 20 can return to a startup (DM_STARTUP) mode 116 automatically. An Init Failure 2 result indicates that the DmInit( ) function 114 failed after the attempt at network initialization (a "recoverable failure"). Upon the detection of a network recovery, the system 20 can then transition back to a startup (DM_STARTUP) mode 116 in an automatic fashion.

The normal mode (DM_NORMAL) 118 is the fully operational mode of the device management object 66. The control subsystem 54 is available to software applications 62 and devices 22 connected to the network 26. In a preferred embodiment, the control subsystem 54 functions available include routing (such as connecting the CD source to the amplifier sink) and device functionality control (such as audio amplifier volume control, and tuner seek control). While in this mode, any application 62 can access the network 26 for any valid purpose. The device management object 66 remains in this operating mode until an application 62 requests a shutdown of the network 26 or a network 26 error occurs. In the case of a requested shutdown, the device management object 66 transitions to a shutdown mode (DM_SHUTDOWN) 122. In the case of an error in the network 26, the device management object 66 transitions to a degraded mode (DM_DEGRADED) 120. When either of these transitions occurs, the device management object 66 can broadcast a notification message to all the applications 62 and devices 22.

The shutdown mode (DM_SHUTDOWN) 122 is the fully disabled mode of the device management object 66. While the device management object 66 is in this mode, no network functionality is available. The transition to the shutdown mode (DM_SHUTDOWN) 122 causes the destruction of all the embedded objects in the object interface layer 58, including all device objects 68 and the network interface object 70. A call to the device management object 66 initialization functionality causes a transition to the Startup mode (DM_STARTUP) 116. Software applications 62 may make use of the device management object 66 shutdown functionality to restart the network interface 72 in case of a noticeable interface failure or a malfunction not detected by the device management object 66. In this case, only the local network interface 72 needs be restarted, not the entire network 26. The appropriate device 22 or software application 62 should also use the device management object shutdown 122 functionality at node power down time, to minimize the effect of the node shutdown 122 on the network 26 that may remain active, and also to minimize any potential memory leak effect related to the operating system environment.

The system 20 transitions to the degraded mode (DM_DEGRADED) 120 when there is an error. The degraded mode (DM_DEGRADED) 120 is the device management object 66 error recovery mode. While in this mode, the device management object 66 automatically can still detect any change in the network interface status (recovery) through the network interface embedded object 70. In a preferred embodiment, the device management object 66 automatically precludes any attempt by any of the devices 22 or software applications 62 to invoke the control subsystem 54. The shutdown functionality is still available from the degraded mode (DM_DEGRADED) 120. If the network interface 72 recovers, the device management object 66 returns to the normal mode (DM_NORMAL) 118 of operations and broadcasts the appropriate message to all the devices 22 and software applications 62. When this happens, all the software applications 62 should make sure that the controlled devices 22 are still available on the network 26 by exercising the discovery subsystem 52. The shared data 102 facilitates the ability of the device management object 66 to facilitate the timely recovery of system 20 functions.

The DmShutdown( ) 1 function is called by device 22 or software application 62 when there is an initialization problem. The DmShutdown( ) 2 function is called by the last device 22 or software application 62 as that device 22 or software application 62 is itself shut down. Upon a shutdown completion at 124, the object DLL 64 is unloaded (erased from memory by being destroyed).

The illustration in FIG. 7 represents numerous different embodiments because the various functions can be implemented in numerous different ways. Moreover, the subsystem structure of FIG. 2 and the layer structure of FIG. 3 can also be incorporated into numerous different systems 20 utilizing different modes.

VI. Functions, Data Structures, and Object Classes

The availability of the functions in the AP interface 86 depends on the mode of the device management object 66. Table A describes the availability of such functions in a preferred embodiment.

TABLE A

| Function | Mode | Availability of a particular function in a particular mode (Yes/No) | Comment |
| --- | --- | --- | --- |
| DmInit( ) | DM_STARTUP | Y | Harmless, returns a NETWORK_BUSY message |
| DmInit( ) | DM_NORMAL | Y | Harmless, returns a NETWORK_AVAILABLE |
| DmInit( ) | DM_DEGRADED | Y | Used to reset the dynamic link library (active recovery) |
| DmInit( ) | DM_SHUTDOWN | N | Cannot be called before shutdown is complete, returns a E_WRONG_OPMODE |
| DmGetStatus( ) | DM_STARTUP | Y | Harmless, but meaningless data may be returned if called before DmInit( ) |
| DmGetStatus( ) | DM_NORMAL | Y | |
| DmGetStatus( ) | DM_DEGRADED | Y | |
| DmGetStatus( ) | DM_SHUTDOWN | Y | |
| DmGetDeviceList( ) | DM_STARTUP | N | Returns a E_WRONG_OPMODE |
| DmGetDeviceList( ) | DM_NORMAL | Y | |
| DmGetDeviceList( ) | DM_DEGRADED | N | Returns a E_WRONG_OPMODE |
| DmGetDeviceList( ) | DM_SHUTDOWN | N | Returns a E_WRONG_OPMODE |
| DmSetCallback( ) | DM_STARTUP | N | Returns a E_WRONG_OPMODE |
| DmSetCallback( ) | DM_NORMAL | Y | |
| DmSetCallback( ) | DM_DEGRADED | N | Returns a E_WRONG_OPMODE |
| DmSetCallback( ) | DM_SHUTDOWN | N | Returns a E_WRONG_OPMODE |
| DmSendMsg( ) | DM_STARTUP | N | Returns a E_WRONG_OPMODE |
| DmSendMsg( ) | DM_NORMAL | Y | |
| DmSendMsg( ) | DM_DEGRADED | N | Returns a E_WRONG_OPMODE |
| DmSendMsg( ) | DM_SHUTDOWN | N | Returns a E_WRONG_OPMODE |
| DmGetResp( ) | DM_STARTUP | N | Returns a E_WRONG_OPMODE |
| DmGetResp( ) | DM_NORMAL | Y | |
| DmGetResp( ) | DM_DEGRADED | N | Returns a E_WRONG_OPMODE |
| DmGetResp( ) | DM_SHUTDOWN | N | Returns a E_WRONG_OPMODE |

TABLE A-continued

| Function | Mode | Availability of a particular function in a particular mode (Yes/No) | Comment |
| --- | --- | --- | --- |
| DmGetDeviceData( ) | DM_STARTUP | N | Returns a E_WRONG_OPMODE |
| DmGetDeviceData( ) | DM_NORMAL | Y | |
| DmGetDeviceData( ) | DM_DEGRADED | N | Returns a E_WRONG_OPMODE |
| DmGetDeviceData( ) | DM_SHUTDOWN | N | Returns a E_WRONG_OPMODE |
| DmSetDeviceData( ) | DM_STARTUP | N | Returns a E_WRONG_OPMODE |
| DmSetDeviceData( ) | DM_NORMAL | Y | If the device was not expected to be found on the network, E_UNEXPECTED_DEVICE can be returned |
| DmSetDeviceData( ) | DM_DEGRADED | N | Returns a E_WRONG_OPMODE |
| DmSetDeviceData( ) | DM_SHUTDOWN | N | Returns a E_WRONG_OPMODE |
| DmCheckNetStatus( ) | DM_STARTUP | Y | |
| DmCheckNetStatus( ) | DM_NORMAL | Y | |
| DmCheckNetStatus( ) | DM_DEGRADED | Y | |
| DmCheckNetStatus( ) | DM_SHUTDOWN | Y | |
| DmShutdown( ) | DM_STARTUP | N | DmInit( ) needs to be complete before DmShutdown( ) can be called, with a return code of E_WRONG_OPMODE |
| DmShutdown( ) | DM_NORMAL | Y | |
| DmShutdown( ) | DM_DEGRADED | Y | |
| DmShutdown( ) | DM_SHUTDOWN | Y | |

The functions described briefly above, are described in greater detail below, in the context of the various modes in the system 20. The system 20 can be flexible, in the number and types of functions that are incorporated. Alternative embodiments may utilize more functions, fewer functions, or significantly different functions.

A. Initialization

Every user process 84 or software application 62 must call the DmInit( ) DLL function before network 26 messaging functionality is available. This function may return a: NETWORK_BUSY, NETWORK_AVAILABLE, DM_CHECK_FOR_OPMODE (successful completion codes), or any of the following lethal error codes: NETWORK_ERROR, E_CREATE_EVENT, E_CREATE_SEMAPHORE, E_CREATE_THREAD, and E_PROC_THREAD_START.

If the DmInit( ) function returns NETWORK_ERROR, the network 26 is not available. A specific error code indicating the nature of the failure can be found in the DmInitError field of a DM_STATUS structure that can be retrieved, regardless of the mode of the network 26 availability, by calling the DmGetStatus( ) DLL interface function. The system 20 checks for network stability problems, and resets if necessary.

If the DmInit( ) function returns NETWORK_BUSY, the DmInit( ) function needs to be called again later. The user process 84 or software application 62 should sleep a little while (typically 500 milliseconds) before calling it again. The user process 84 or software application 62 may have to call the DmInit( ) function up to 60 times before the request can be processed, as the initialization process should preferably take no more than up to 30 seconds when numerous devices 22 are found on the network 26.

The network 26 is readily available when the DmInit( ) function returns NETWORK_AVAILABLE. The DmInit( ) function returns the DM_CHECK_FOR_OPMODE code when this function is called while the DLL operational mode is not DM_NORMAL. The operational mode of the DLL can be found in the DmOpMode field of the DM_STATUS structure that can be retrieved, regardless of the state of the network 26 availability, by calling the DmGetStatus( ) DLL interface function. Calling DmInit( ) while the operational mode of the DLL is persistently DM_DEGRADED can be used by the user process 84 or software application 62, as a means of requesting a reset of the DLL (making an attempt at active network connectivity recovery, e.g., "active network recovery").

Any other DmInit( ) return code (E_CREATE_EVENT, E_CREATE_SEMAPHORE, E_CREATE_THREAD, and E_MPROC_THREAD_START) indicates a lack of resource from the operating system 78. Calling DmInit( ) again is possible but will likely result in the same failure. The system 20 checks the number of active processes, and resets the process or the device 22 if necessary.

B. Shutdown

A user process 84 or software application 62 should call the DmShutdown( ) DLL function before terminating to free the related resources within the object DLL 64. This function may return a NETWORK_SUCCESS, NETWORK_BUSY (successful completion codes), or the following error codes: E_WRONG_OPMODE, or NETWORK_ERROR.

If the DmShutdown( ) function returns NETWORK_SUCCESS, the shutdown for the user process 84 or software application 62 is complete and no further action is needed. If the DmShutdown( ) function returns NETWORK_BUSY, the function needs to be called again later. Shutdown is already in progress for another user process 84 or software application 62. The user process 84 or software application 62 should sleep a little bit (typically 500 ms) before calling the function again. No more than 10 attempts should preferably be necessary before the requested functionality is available.

If the DmShutdown( ) function returns E_WRONG_OPMODE, it means that the function was called within the DM_STARTUP operational mode context. The user process 84 or software application 62 may call again the function when the object DLL 64 operational mode transitions to any other mode. The operational mode of the object DLL 64 can be found in the DmOpMode field of the DM_STATUS structure that can be retrieved, regardless of the state of the network 26 availability, by calling the DmGetStatus( ) function.

When the DmShutdown( ) function results in a NETWORK_ERROR, a specific error code indicating the nature of the failure can be found in the DmShutdownError field of the DM_STATUS structure that can be retrieved, regardless of the state of the network 26 availability, by calling the DmGetStatus( ) function. In this case, a memory leak is likely to occur. It is not necessary to call the DmShutdown( ) function again.

C. Get Status

A user process 84 or software application 62 may monitor the object DLL 64 mode information by calling the DmGetStatus( ) DLL function. This function may return any of the following success codes: NETWORK_BUSY, NETWORK_ SUCCESS, or any of the following error codes: E_DM_ FATAL, E_MEMCPY_FAILED, and E_BADPOINTER.

The user process 84 or software application 62 needs to supply a pointer to the user process 84 or software application 62 in the specific storage for the object DLL status data. The DmGetStatus( ) function copies the appropriate data to the indicated memory area.

If the DmGetStatus( ) function returns NETWORK_BUSY, the function needs to be called again later. The user process 84 or software application 62 should sleep a little bit (typically 500 ms) before calling the function again. No more than a few attempts should be necessary before the requested functionality is available.

The NETWORK_SUCCESS return code indicates that the object DLL 64 status data has been successfully copied to the memory area indicated by the calling user process 84 or software application 62 and is available. An E_MDM_FATAL return code indicates that the network interface 72 is currently disabled for all client applications. Any client application may call the DmInit( ) DLL function to restart the network interface 72.

An E_MEMCPY_FAILED return code indicates either a bad pointer value passed in or an operating system 78 problem. The DM object shutdown functionality may have to be invoked. An E_BADPOINTER return code indicates that a NULL pointer value was passed in. The status data can include the current operational mode of the object DLL 63 (DmOpMode), which should always be DM_NORMAL. An operational mode of DM_STARTUP can mean that the object DLL 64 functionality is not started yet or is currently recovering from a previous malfunction. An operational mode of DM_SHUTDOWN means that the object interface layer 58 has been shutdown. An operational mode of DM_DEGRADED means that an error occurred on the network 26. A device 22 may have to be reset or the network may have to be trouble-shooted if the network 26 does not recover quickly.

The status data can include the current status of the network interface object 70 to the network 26 (NetCommSts), which should always be NETWORK_AVAILABLE. It should be set to NETWORK_FAILURE when the operational mode is DM_DEGRADED. The status data can also include the number of devices 22 currently known on the network 26 (NumNetDev). The latest initialization operation error code (DmInitError), the latest send message operation error code (DmSendError), the latest get response operation error code (DmRespError), and the latest shutdown operation error code (DmShutdownError) can be included in the status data. In a preferred embodiment, the DLL interface availability flag (DmAppReady) that can be monitored by user processes 84 and software applications 62 can also be included in status data. The DLL interface availability flag indicates whether the DLL interface is available, or available again in case of temporary network 26 failure.

D. Get Device List

A user process 84 or software application 62 needs to retrieve the list of devices 22 currently known on the network 26. This can be done by calling the DmGetDeviceList( ) DLL function. This function returns the number of devices 22 readily available on the network 26, and 0 (zero) in case of the failure of object interface layer 58.

The user process 84 or software application 62 must provide the address of the array of DM_DEV_INFO structures where the device 22 information can be copied, as well as the size of the array. The user process 84 or software application 62 must then select the device(s) 22 it wants to control and make reference to the index of the device(s) 22 in the returned array for functionality requested from the device 22.

The data contained in any of the returned DM_DEV_INFO structures can include the current device status (DevStatus), which should always be DM_READY if the device initialization was successful (otherwise it is set to DM_NOT_READY). The data can also include the network device 22 name as reported on the network (DevName). This may be renamed by the object DLL 64 at initialization for cosmetic reasons. The DM_DEV_INFO structure can include a device 22 classification for information purposes (DevClass). Options can include INVALID_NODE, AUDIOAMP, HEADAMP, AUXINP, CDPLAYER, TUNER, VIDEODISPL, YNAMVP, NAVDEV, CDDVD, NETWORKKEYPAD, YNAMASTER, and UNKNOWN. Device type information can also be included in DM_DEV_INFO. Options for device type information include INVALID_NODE_TYPE, AUDIOSOURCENODE, AUDIOSINKNODE, VIDEOSOURCENODE, VIDEOSINKNODE, AVSOURCEANDSINKNODE, AVSOURCENODE, and DATASOURCENODE.

DM_DEV_INFO can also include: the device instance as reported on the network (DevInstNum) for diagnostic purposes, the number of capabilities in the list following (NumCapInList), the list of all the network device 22 specific functions exhibited on the network and supported by the device (DevCapList) (up to DM_MAX_FKT_IDS elements in this array), and the node address of the device as reported on the network (s_NodeAdr) for diagnostic purposes.

The capability list related data members of the DM_DEV_INFO structure is not filled in after the object DLL initialization. The user process 84 or software application 62 can request this data member to be filled by sending the appropriate message to the specific device.

E. Set Callback

A user process 84 or software application 62 may register/deregister callback functions with the object DLL 64 by calling the DmSetCallback( ) DLL function.

In a preferred embodiment, this function can return the following success codes: NETWORK_BUSY and NETWORK_SUCCESS. In a preferred embodiment, this function can return the following error codes: E_DM_FATAL, E_WRONG_OPMODE, E_INVALID_PROC_HANDLE, E_NO_CLIENT_FOUND, E_INVALID_CB_ACTION, E_BAD_CB_PTR, E_INVALID_DEVINDEX, E_TOO_MANY_CBS, E_CREATE_EVENT, E_CREATE_SEMAPHORE, E_CREATE_THREAD, E_CB_REG_SEND, E_CB_REG_SEND_BUSY, and E_CB_DEREG.

If the DmSetCallback( ) function returns NETWORK_BUSY, the function needs to be called again later. The user process 84 or software application 62 should sleep a little bit (typically 500 ms) before calling the function again. No more than a few attempts should be necessary before the requested functionality is available.

The NETWORK_SUCCESS completion code indicates a successful callback function registration with the API interface 86.

An E_DM_FATAL return code indicates that the network interface 72 is currently disabled for all user processes 84 and software applications 62. Any user process 84 or software application 62 may call the DmInit( ) DLL function to restart the network interface 72.

An E_WRONG_MODE return code means that the object DLL 64 operational mode is not DM_NORMAL. The E_INVALID_PROC_HANDLE and E_NO_CLIENT_FOUND return codes indicate that the user process 84 or software application 62 is not correctly registered with the object DLL 64. Either DmInit( ) was not called originally or the operating system 78 was lacking resources at this time, and the DM object shutdown functionality may have to be invoked.

The E_INVALID_CB_ACTION, E_BAD_CB_PTR and E_INVALID_DEVINDEX may indicate that the callback control block passed in is either a NULL pointer or contains invalid parameters. An E_TOO_MANY_CBS error code indicates that there is no more available space in the callback array. In this case, the callback strategy between all user processes 84 and software applications 62 needs to be revised, or the number of callbacks in the appropriate array needs to be increased. The default for MAX_NUM_APP_CALLBACKS is 64 in a preferred embodiment and the default for MAX_NUM_GEN_CALLBACKS is 8 in a preferred embodiment.

The E_CREATE_EVENT, E_CREATE_SEMAPHORE, and E_CREATE_THREAD return codes indicate that the callback mechanism will not work because of insufficient operating system 78 resources, the DM object shutdown functionality may have to be invoked. The E_CB_REG_SEND, E_CB_REG_SEND_BUSY return codes indicate that the callback was partially registered with the object DLL 64. The callback needs to be de-registered first before any attempt at registration can be attempted again.

The E_CB_DEREG return code is for information purposes. It means that the callback de-registration process failed. The callback control block was not found.

The user process 84 or software application 62 must provide a description of the reason why the callback function specified should be called. This description is located in the DM_CB_SETUP structure passed to the DLL function. The data contained in this structure can include the following examples of information:

An action code (ActionCode) can be used to specify registration or deregistration of the callback. Options include DM_REG_CB (to register a callback), DM_DEREG_CB (to deregister a specific callback) and DM_DEREG_ALL_CB (to deregister all callback functions associated with the specific client application).

The handle of the calling process (hModule) can be used internally by the DM DLL 64 for tracking user processes 84 and software applications 62.

A pointer (pCallback) to the callback function can be passed to the DLL function by fulfilling one or more of the following four requirements. First, the index (TargetIndex) of the DM_DEV_INFO of the targeted device can be retrieved with DmGetDeviceList( ). System 20 options can include a valid device index or CB_FOR_ALL_DEVICES if the software application 62 or user process 84 wants the specified callback to be called for all devices messages reaching the object DLL 64. Second, a boolean flag can be set to indicate if the software application 62 or user process 84 should be notified of network status changes via the provided callback function (NetStsReq can be set to either TRUE or FALSE). Third, an optional user process 84 or software application 62 can specify the automated back of data at callback time (UserData) for the sole use of the user process 84 or software application 62. The object DLL 64 does not set or modify this parameter. Fourth, the client number (ClientNum), a unique identifier for a client (a user process 84 or software application 62) can be created and used by the object DLL 64. The user process 84 or software application 62 does not need to set this number.

A maximum of MAX_NUM_APP_CALLBACKS (for device specific callback) and MAX_NUM_GEN_CALLBACKS (for all devices messages callback) is allowed for all user processes 84 and software applications 62 registered with the object DLL 62. In a preferred embodiment, the user process 84 or software application 62 should not perform any substantial functionality within its callback functions. The DmGetDeviceData( ), DmGetStatus( ) and DmGetDeviceList( ) functions may be called by the user process 84 or software application 62 callback, but should not be called in a loop. No other API function 86 should be called within the context of a callback function in a preferred embodiment.

The user process 84 and software application 62 can register or deregister any callback at any time during the life of the user process 84 or software application 62. There is no need to deregister any callback at application termination. The object DLL 64 automatically deregisters all callbacks related to a terminating user process 84 or software application 62.

F. Sending Messages

1. Sending Data Messages

A user process 84 or software application 62 may send data to a device 22 by either calling directly the DmSendMsg( ) function or by calling the DmSetDeviceData( ) function first, to set the data to send in the object DLL 64 device specific internal data structure, and then by calling the DmSendMsg( ) function with the appropriate device function so that the data previously set is used at network message encoding time.

2. Sending control messages

A user process 84 or software application 62 may send control messages to network devices 22 by calling the DmSendMsg( ) function in either a blocking mode or a non-blocking mode.

In a blocking mode, the DmSendMsg( ) function does not return until either the device 22 response is received or the network 26 request times out. In the case of the device 22 response being received, the response data may be included in the original message structure. In a preferred embodiment, whether or not control messages are sent in a blocking mode depends on the capabilities of the network 26 and the anticipated resource utilization of the devices 22 connected to the network 26. In a non-blocking mode, the DmSendMsg( ) function returns immediately after the message is passed to the network interface object 70. In both blocking and non-blocking modes, the eventual response data may be retrieved later by calling the DmGetDeviceData( ) or DmGetResp( ) functions.

The user process 84 or software application 62 must pass to the DmSendMsg( ) function a description of the control message it wants to send to the device 22. This description is located in the DM_MSG data structure. The data contained in this structure can include:

- The index in the DM_DEV_INFO structure array of the targeted device (TargetIndex).
- The requested function to be performed by the device (DevFunc). This parameter can be encoded as follows: the high WORD contains the operation to perform (e.g., SET, GET, SETGET, etc.) while the low WORD contains the function ID (e.g., CONNECT, VOLUME, BASS, BALANCE, SCAN, etc.).
- Any additional data needed to perform the required functionality (AddlData). This parameter is function dependent.
- The request identifier (ReqId) element is filled in by the DM DLL and must be used by the user process 84 or software application 62 when requesting a response to a previously sent message.
- The value (in ms) of the request timeout parameter (TimeoutVal) indicates to the object DLL 64 if the request is blocking (>0) or non-blocking (0.) The maximum timeout value allowed by the object DLL 64 is DM_MAX_TIMEOUT_DELAY.
- The status of the send message operation (SendStsCode). This parameter is filled in by the object DLL 64 and can take the following values: E_UNEXPECTED_FUNCTION (function ID not supported by the object DLL), NETWORK_SEND_SUCCESS (only used for blocking mode, indicates that the response to the specific request was received), E_PENDREQ_TIMEOUT (only used for blocking mode, indicates that the request expired before the response to the specific request was received), MOST_SENDBUF_OK (only used for non-blocking mode, indicates that the request was successfully passed to the network interface object 70 for sending).
- The network device data response status code (RespStsCode). This parameter is filled in by the object DLL 64 and can take the following values: NETWORK_SUCCESS (used when the send message is successful and that the response data received fits in a standard system 20 string); NETWORK_ERROR (indicates a send message failure if the SendStsCode is set to E_UNEXPECTED_FUNCTION, or a device 22 response data decoding error if the RespData parameter is 0, or finally an error that occurred at the device level in which case the RespData parameter contains the operation status as returned by the device); NETWORK_RESP_PENDING (used only for non-blocking requests and indicates that the request was successfully sent and that the response has not been received yet); and NETWORK_NO_DATA SET (indicates that the request-response cycle completed successfully but that the data does not fit in a standard system 20 string).

The network device 22 response data (RespData), set if the send message request was made in blocking mode, the data fits in a standard string of the system, and the response status code is NETWORK_SUCCESS or NETWORK_ERROR. This parameter is irrelevant if the send message request was made in non-blocking mode.

The timeout status code (TimeoutStsCode). This parameter is filled in by the object DLL 64 and is relevant only if the send message request was made in blocking mode. It can take the following values: E_PENDREQ_TIMEOUT (the blocking send message request has timed out) or NETWORK_SUCCESS (successful blocking send message-received response round trip).

The DmSendMsg( ) function returns the following success codes: NETWORK_BUSY and NETWORK_SUCCESS. The following error codes can be returned: E_DM_FATAL, E_NO_CLIENT_FOUND, E_WRONG_OPMODE, E_BADPOINTER, and E_DMSEND_TIMEOUT.

If the DmSendMsg( ) function returns NETWORK_BUSY, the function needs to be called again later. The user process 84 or software application 62 should sleep a little bit (typical 500 ms) before calling the function again. No more than a few attempts should be necessary before the requested functionality is available.

A NETWORK_SUCCESS return code indicates that the non-blocking send request was passed successfully to the network interface object 70 or that the blocking send request was sent and the data response was successfully received.

An E_DM_FATAL return code indicates that the network interface 72 is currently disabled for all user processes 84 and software applications 62. Any user process 84 or software application 62 may call the DmInit( ) function to restart the network interface 72.

An E_NO_CLIENT_FOUND return code indicates that the user process 84 or software application 62 is not correctly registered with the object DLL 64. Either DmInit( ) was not called originally or the operating system 74 was lacking resources at this time, and thus the DM object shutdown functionality may need to be invoked.

An E_WRONG_MODE return code means that the object DLL 64 operational mode is not DM_NORMAL.

An E_BADPOINTER return code indicates that the pointer to the message passed in is NULL.

An E_DMSEND_TIMEOUT return code indicates that the send message operation timed out from the API interface 86 perspective. The send process may still be proceeding. This may indicate significant delays on the network 26. The user process 84 or software application 62 may attempt to resend the message or check the expected response.

The DmSendError field located in the DM_STATUS structure should be inspected to make sure that the operation is really successful, or to gather more information about the eventual failure. The DM_STATUS structure can be retrieved, regardless of the state of the network availability, by calling the DmGetStatus( ) function.

G. Receiving Messages

The system 20 can use at least three different methods as outlined below, for a user process 84 or software application 62 to receive unsolicited messages from the object DLL 64.

These three methods are not mutually exclusive. The first two methods can be combined.

1. Method 1

A user process 84 or software application 62 can receive unsolicited messages by registering a callback function with the object DLL 64, and sending a notification request to a specific network device 22.

Sending a notification request to a specific network device 22 requires the use of the DmSendMsg( ) described above. The format of the message sent is described below. All devices 22 are supposed to support the notification function ID for either all of their function ID's or on a per function ID basis. To request notification from a specific network device 22, the DM_MSG structure should be set as follows:

DevFunc parameter set to NOTIFICATION;

TargetIndex parameter set to the network device 22 index in DM_DEV_INFO array;

The low word of the AddlData parameter set to either SETALL, SETFUNCTION, CLEARALL, CLEARFUNCTION; and The high word of the AddlData parameter set either 0 for SETALL or CLEARALL low word, or to the specific function ID to set or clear notification for the SETFUNCTION and CLEARFUNCTION low word values.

2. Method 2

A user process 84 or software application 62 can also receive network status unsolicited messages by registering a callback function with the object DLL 64 and setting the NetStsReq parameter in the DM_CB_SETUP structure to TRUE.

3. Method 3

A user process 84 or software application 62 can receive all messages received by the object DLL 64 from any of the network devices 22 by registering a callback function with the object DLL 64 and setting the TargetIndex parameter to CB_FOR_ALL_DEVICES.

H. Retrieving Data

In a preferred embodiment of the system 20, the two methods described below can be used by a user process 84 or software application 62 to retrieve device 22 specific data.

1. Method 1

The user process 84 or software application 62 can request the response data corresponding to a specific request it recently sent via the object DLL 64 by calling the DmGetResp( ) method. This method should be called if the original send request was made in non-blocking mode or if a blocking send request timed out, and that the response should contain data.

The user process 84 or software application 62 must pass to the DmGetResp( ) function a DM_MSG structure. This structure can be the original structure used for the send request or any other DM_MSG structure containing the ReqId parameter returned in the original DM_MSG send request structure. This is the only parameter that needs to be set in the DM_MSG structure before calling the DmGetResp( ) function.

The DmGetResp( ) function returns NETWORK_ERROR and all the DmSendMsg( ) error codes for the corresponding errors. The NETWORK_ERROR return code indicates that the pointer to the message passed in is a NULL pointer. The NETWORK_SUCCESS return code indicates that the response has been successfully received from the object DLL 64 internal storage.

Specific information about the original message status may be found in the DM_MSG structure itself, in the SendStsCode, RespStsCode and RespData, or TimeoutStsCode data elements.

2. Method 2

The user process 84 or software application 62 has access to the network device internal data storage via the DmGetDeviceData( ) DLL function. This function copies the most current device specific data to the user process 84 or software application 62 provided data storage. In a preferred embodiment, this data storage is the shared data 102. The device specific data is maintained by either requesting notification for the specific device data or by directly requesting the data via the DmSendMsg( ) function.

The user process 84 or software application 62 must pass to the DmGetDeviceData( ) function a DM_DEVICE_DATA structure. In a preferred embodiment, this structure contains three data members:

The index in the DM_DEV_INFO structure array of the targeted device (TargetIndex);

The system 20 estimate of the accuracy of the data returned (DataAccuracy); and A union of all the network device 22 data structures (sData) supported by the object DLL 64. The device specific structure in this union is filled in by the DmGetDeviceData( ) function, according to the device class of the targeted device, and after the expected data structure size is checked against the user process 84 or software application 62 specified data size (second function parameter passed to the DmGetDeviceData( ) function).

As mentioned above, the user process 84 or software application 62 must also pass to the function the size of the device specific data structure to be filled, not the size of the DM_DEV_DATA structure.

The DmGetDeviceData( ) function returns the following success codes: NETWORK_BUSY and NETWORK_SUCCESS. The possible error codes are as follows: E_DM_FATAL, E_WRONG_OPMODE, E_BADPOINTER, E_INVALID_DEVINDEX, E_UNEXPECTED_DEVICE, and E_INVALID_DATASIZE.

If the DmGetDeviceData( ) function returns NETWORK_BUSY, the function needs to be called again later. The user process 84 or software application 62 should sleep a little bit (typical 500 ms) before calling the function again. No more than a few attempts should be necessary before the requested functionality is available.

The NETWORK_SUCCESS success code indicates that the device specific data is successfully copied from the internal storage to the client provided storage. An E_DM_FATAL return code indicates that the network interface 72 is currently disabled for all user processes 84 and software applications 62. Any user processes 84 or software applications 62 may call the DmInit( ) function to restart the network interface 72.

An E_WRONG_OPMODE return code indicates that the object DLL 64 is not in the DM_NORMAL mode.

An E_BADPOINTER return code indicates that the pointer to the DM_DEV_DATA structure passed in is NULL.

An E_INVALID_DEVINDEX return code indicates that the TargetIndex data member of the DM_DEV_DATA structure is found invalid.

An E_UNEXPECTED_DEVICE return code indicates that the device class corresponding to the target index passed in the DM_DEV_DATA structure is not supported by the object DLL 64.

An E_INVALID_DATASIZE return code indicates that the data size passed in the second function parameter does not correspond to the size of the device specific data structure currently supported by the object DLL 64 (may indicate new software revision needed).

I. Messaging Strategies

The purpose of messaging strategies is to present the user process 84 or software application 62 a series of messaging strategies so that the user process 84 or software application 62 can take full advantage of the object DLL 64 without degrading the network 26 performance. A user process 84 or software application 62 can select any of the three messaging strategies outlined below or a mix of all three if necessary.

1. Method 1—Send Message/Get Response/Inspect Data

The user process 84 or software application 62 can send a control message to a network device 22 via the DmSendMsg( ) function in non-blocking mode.

If the control message sent requires a response from the device 22, the user process 84 or software object 62 can call the DmGetResp( ) function, specifying the request ID returned by the object DLL 64 in the original message sent, to receive a copy of the current status of the original request. This function should be called soon after the send message call completes (no more than 1 sec) depending on the number of messages sent to the specific network device 22 per second. The object DLL 64 buffers and maintains up to DM_MAX_PEND_REQ outstanding messages. If several client applications send messages to the same device 22, the DmGetresp( ) function may need to be called more quickly.

If the control message sent does not require a response from the network device 22, no further action is required from the user process 84 or software application 62.

The internal network device data may be inspected at any time by calling the DmGetDeviceData( ) function. The internal network device data structure (shared data 102 in a preferred embodiment) is updated only when either an unsolicited message is received from the physical network device (notification of a change in data) or when a response to a previously sent control message is received.

2. Method 2—Send Message/Asynchronous Callback

The user process 84 or software application 62 can register a callback function for the specific device(s) 22 it wishes to control, just after having selected the device(s) 22 from the device list returned by the DmGetDeviceList( ) function.

The user process 84 or software application 62 can then send a control message to a network device via the DmSendMsg( ) function in non-blocking mode and be automatically notified when the response is received from the network device 22 via the registered callback.

Additionally, the user process 84 or software application 62 can send notification control messages to the network devices and be automatically notified of the data changes via the registered callback. The notification message can be specified to the network function ID level (for devices 22 supporting this level of detail).

The system 20 should not over-use notification (especially with devices 22 that support only the nothing or all notification mechanism) as it may significantly increase network traffic, significantly degrading performance.

3. Method 3—Send Message/Block Until Response is Received

The user process 84 or software application 62 can send a control message to a network device via the DmSendMsg( ) function in blocking mode. The function will block till the response is received or till the timeout value placed on the call expires.

Even if the send message/receive response cycle is successful, the user process 84 or software application 62 can still use any of the other methods to access the device specific data (DmGetDeviceData( ) function) or the send message specific response (DmGetResp( ) function).

This method may not be preferred in a multi-process environment because it will significantly slow down the response time for all user processes 84 and software applications 62.

J. Supported Device Functions

The system 20 formats DM_MSG structure elements to identify which user process 84 or software application 62 desires to exercise a particular functionality. The DM_MSG structure needs to be filled before the DmSendMsg( ) function is called. Some of the DM_MSG structure elements may be filled in when the DmSendMsg( ) function returns (e.g., error codes, request ID, etc.). A preferred embodiment of the system 20 supports at least the following device 22 classes/categories:

AUDIOAMP: Audio amplifier devices;
HEADAMP: Headphone amplifier devices;
AUXINP: Auxiliary input devices;
CDPLAYER: CD player and changer devices;
TUNER: Tuner devices;
VIDEODISPL: Video display devices (decoder and display);
YNAMVP: Multi-video player devices;
NAVDEV: Navigation information devices;
CDDVD: CD DVD player devices;
REMOTEMMI: Remote keypad and keyboard devices;
YNAMASTER: Network master devices;
CANGATEWAY: Gateway to CAN network; and
1394GATEWAY: Gateway to 1394 network.

K. Network Recovery Strategies

In a preferred embodiment, the DmCheckNetStatus( ) function allows for passive and active recovery strategies when the network 26 experiences temporary connectivity problems.

The DmCheckNetStatus( ) function automatically monitors the network status for a period of time determined by the user process 84 or software application. The period of time can be passed to the function as a parameter. If the network 26 becomes available before the timeout period expires, the function returns NETWORK_AVAILABLE.

If timeout period expires and the network 26 is not available, the function returns NETWORK_ERROR.

An E_DM_FATAL return code indicates that the network interface 72 is currently disabled for all user processes 84 and software applications 62. All user processes 84 and software applications 62 need to call the DmInit( ) function to restart the network interface 72 and re-register with the object interface layer 58.

1. Passive Recovery Strategy

A passive network recovery strategy can be implemented by calling the DmCheckNetStatus( ) in a loop until it is determined that the network 26 recovered or that a more active recovery is required.

2. Active Recovery Strategy

An active network recovery strategy can be implemented by using first the passive recovery strategy and if the passive recovery fails, calling the DmInit( ) function after making sure that the object DLL 64 operational mode is DM_DE- GRADED. This provokes an active reset of the object DLL 62. The passive recovery can then be used again to check of the network recovery.

3. Post-Recovery Processing

All callbacks should be registered again, device lists should be reset and reinitialized by calling the DmGetDeviceList( ) function.

VII. Thread Processing

The various threads used by the system 20 invoke one or more of the functions described above.

Figure 8:
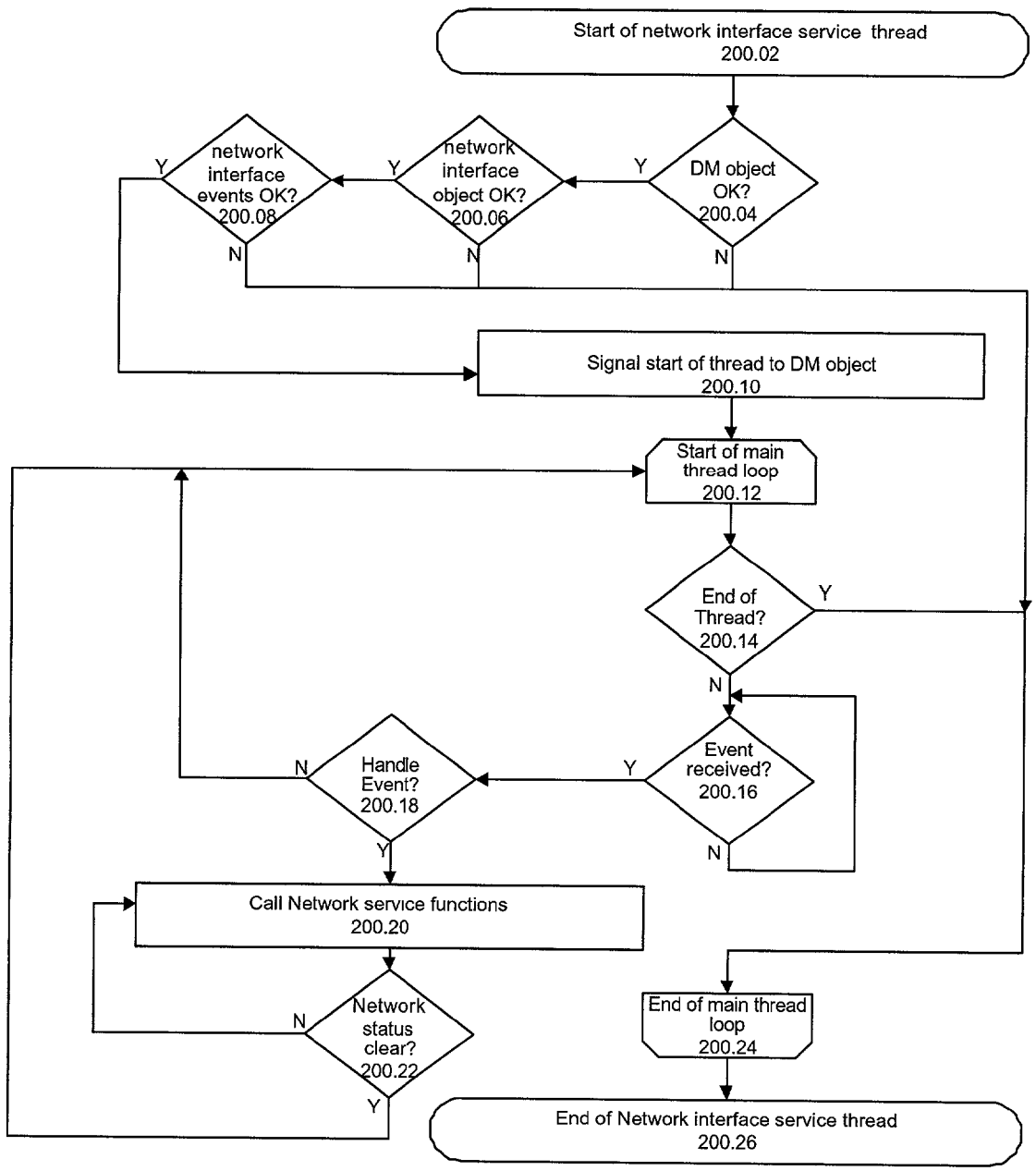
FIG. 8 is a flowchart illustrating the process of a network service interface thread.

FIG. 8 is a flowchart of the network interface service thread 106, showing the behavior of the independent interface service thread for the duration of its life cycle. Interface threads 106 operate between the network driver 74 and the network callback interface 100.

The process begins at 200.02. The system 20 determines whether the device management object 66 is functioning properly at 200.04. If the device management object 66 is functioning properly at 200.04, the system 20 determines whether the network interface object 70 is functioning properly at 200.06. If the network interface object 70 is functioning properly at 200.06, the system 20 determines whether the network interface processing ("network processing events") is functioning properly at 200.08. If the events are functioning properly at 200.08, the network interface thread sends a signal to the device management object 66 at 200.10. This signal indicates that the network interface thread has successfully started. If there is a problem with the device management object 66 at 200.04, the network interface object 70 at 200.06 or the interface events at 200.08, the process jumps to the end of the main thread loop at 200.24, and the thread then ends unsuccessfully at 200.26.

If the start of the thread is signaled at 200.10, the main thread loop can begin at 200.12. If the thread is completed, the process proceeds to steps 200.24 and 200.26, and the thread ends. If the thread is not completed at 200.14, the system 20 checks to see if an interface event has been received at 200.16. The system loops at 200.16, waiting for an interface event. When the interface event is received at 200.16, the system 20 asks at 200.18 whether the event requires handling. If no handling is required, the process returns to 200.12, the start of the main thread loop.

If the handling of an event is required at 200.18, network service functions can be called at 200.20. If the network status is satisfactory at 200.12, the process returns to the beginning of the loop at 200.12. If the network status is not satisfactory at 200.22, the network service function is called at 200.20 until the network status becomes satisfactory. At some point, the network service functions at 200.20 can themselves terminate the thread if the network status for a particular user process 84 or software application 62 cannot be reset and cleared.

Figure 9:
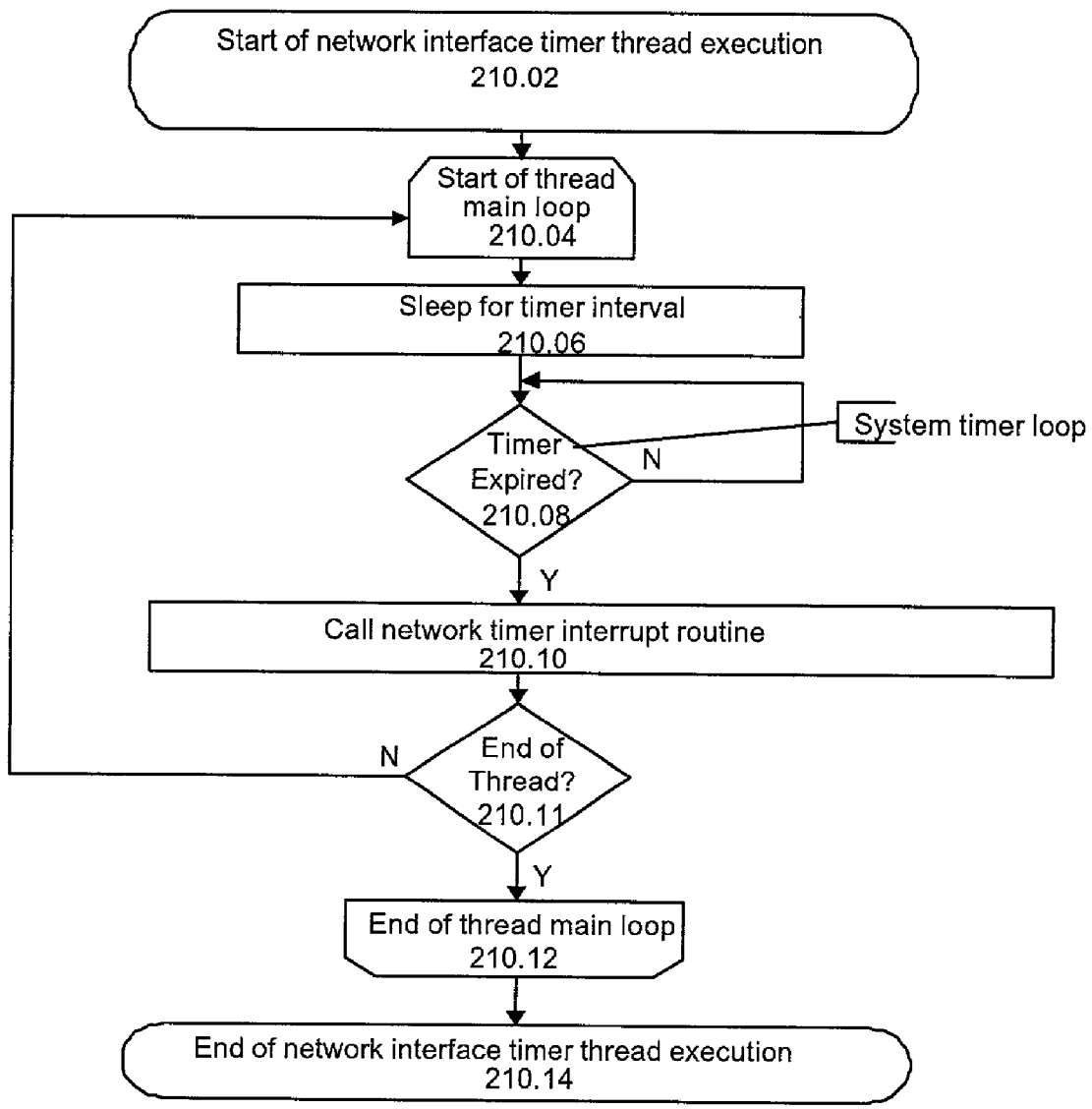
FIG. 9 is a flowchart illustrating the process of a network interface timer thread.

FIG. 9 discloses a flow chart of the network timer interface thread 108. The timer event thread 108 interacts with the interface thread 106 described above. The main loop for the interface timer thread 108 begins at 210.04 after the thread has begun at 201.02. The system 20 sleeps for the predetermined time interval as set by the user process 84 or software application 62 at 210.06. The system 20 determines at 210.08 whether the predetermined time interval has expired. The network timer interrupt routine can then be called at 210.10. If the network interface thread 108 continues the process, the loop returns to step 210.04. If the network interface thread 108 is completed at 210.11, the process loop goes to step 210.12, the end of the thread loop, and the thread terminates at 210.14. The timer event thread 108 should continue processing for as long as the interface thread 108 continues processing.

Figure 10:
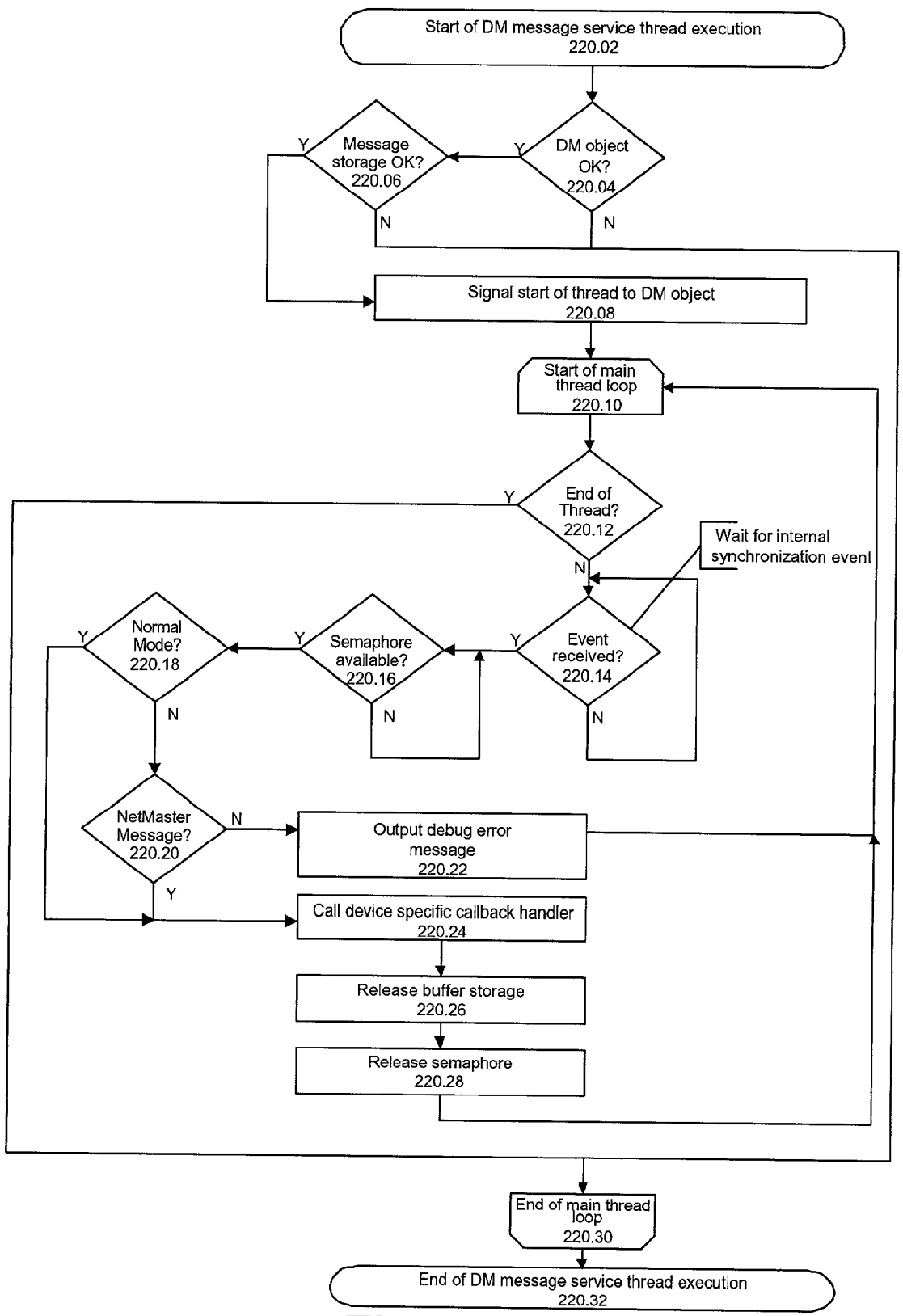
FIG. 10 is a flowchart illustrating the process of a device management message thread.

FIG. 10 discloses a flow chart of the DM object message service thread 96 in the device management object 66. The thread receives input from the network callback interface 100, and sends output to the shared data structure 102 and to the callback threads 92.

The start of the thread execution occurs at 220.02. At 220.04 the system 20 determines whether the device management object 66 is functioning properly. At 220.06 the system 20 determines whether the message storage function in the shared data structure 102 is functioning properly. If there is a problem detected at either determination, the process jumps to the end of the main loop at 220.30, and the message service thread ends at 220.32.

If no problem is detected at 220.04 or 220.06, the start of the thread is signaled to the device management object 66 at 220.08. The main thread loop begins at 220.10. The system 20 determines whether the thread has completed processing at 220.12. If so, the process proceeds to steps 220.30 and 220.32, terminating the thread. If the thread has not completed processing, the system 20 checks the validity of the event received at 220.14. If an event is not valid, the system 20 waits for an event until an event is received. Once an event is validated at 220.14, the system 20 determines at 220.16 whether a semaphore is available. A semaphore is a variable used to govern access to shared system 20 resources. The semaphore indicates whether other potential processes are using a particular file, object, or piece of information. If so, the semaphore can lock up the resource, preventing access by more than one source. The system 20 does not proceed past 220.16 until a semaphore is available to lock the resource in an appropriate manner. The system 20 next proceeds to step 220.18, and determines whether the system 20 is currently in a normal mode (in contrast to a shutdown, degraded, or startup mode.

If the system 20 is operating in a normal mode at 220.18, the system 20 then calls the device specific callback handler at 220.24. Buffer storage can be released at 220.26, and the semaphore can be released at 220.28 so that other resources can subsequently be locked. The process then returns to the beginning of the loop at 220.10.

If the system 20 is not in a normal mode at 220.19, the system 20 then determines whether there is a netmaster message at 220.20. A netmaster message is simply a message from a netmaster device for regulating the processing of the network 26. It is a form of overriding the normal processing rules of the network 26. If there is a netmaster message at 220.20 indicating that processing should proceed as normal, the system 20 proceeds to 220.24. If there is not an appropriate netmaster message at 220.20, an output debug error message is sent at 220.22, and the process returns to the main thread loop at 220.10.

Figure 11:
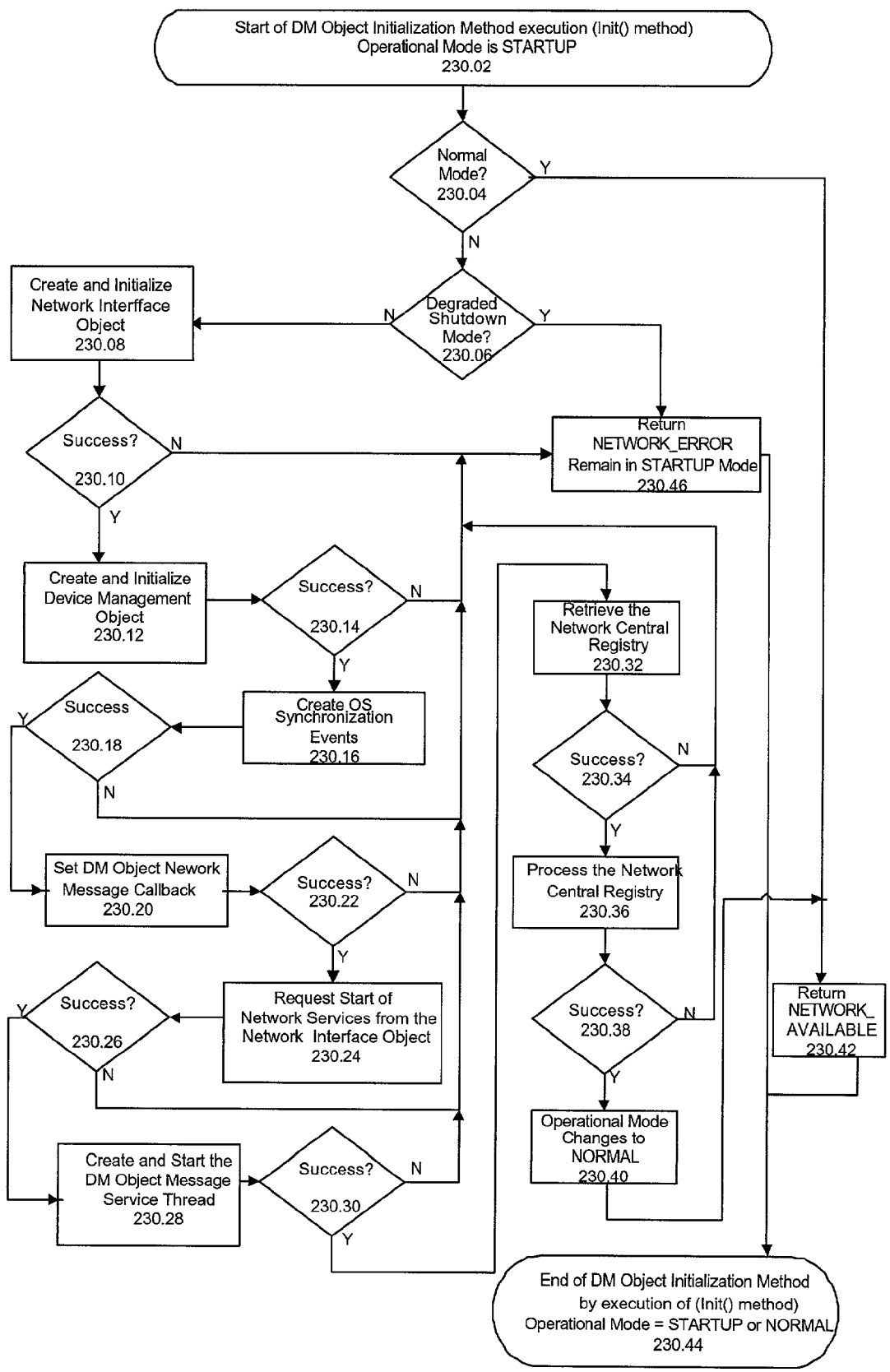
FIG. 11 is a flowchart illustrating the process of initializing a device management object.

FIG. 11 discloses a flowchart of the execution of the DmInit( ) process for the device management object 66. The start of the initialization method begins at 230.02 when the operational mode is in startup. The system 20 determines at 230.04 whether the system 20 has transitioned to a normal mode at 230.04. If the system 20 has transitioned to a normal mode at 230.04 because another event has triggered the successful initialization of the device management object 66 since the system 20 was at 230.02, the system 20 returns a NETWORK_AVAILABLE status at 230.42, and the process terminates at 230.44.

If the mode at 230.04 is not normal, the system 20 determines whether the mode at 230.06 is either degraded or shutdown. If the mode of system 20 at 230.06 is either degraded or shutdown, the system 20 proceeds to 230.46, and returns a NETWORK_ERROR with the attempted initialization of the device management object 66 remaining in startup mode and the process terminating at 230.44.

If the mode at 230.06 is neither degraded nor shutdown, a network interface object 70 is then created and initialized at 230.08. If the system 20 determines at 230.10 that the network interface object 70 was not successfully created, the system 20 proceeds to the error processing at 230.46 described above.

If the network interface object 70 is correctly created and initialized at 230.08, and that success is detected at 230.010, the device management object 66 is then created and initialized at 230.12. At 230.14, the system 20 determines whether the process at 230.12 was successful. If it was not successful, the system 20 proceeds to the error processing at 230.46 described above.

If the process as 230.12 was successful, and that success is confirmed at 230.14, the system 20 proceeds to create operating system synchronization events at 230.16. At 230.18, the system 20 determines whether the process at 230.16 was successful. If it was not successful, the system 20 proceeds to the error processing at 230.46 described above.

If the process at 230.16 was successful, and that success is confirmed at 230.18, the system 20 proceeds at 230.20 to set the message callback interface 88. At 230.22, the system 20 determines whether the process at 230.20 was successful. It was not successful, the system 20 proceeds to the error processing at 230.46 described above.

If the process at 230.20 was successful, and that success is confirmed at 230.22, the network interface object 70 can request the start of network services at 230.24. At 230.26, the system 20 determines whether the process at 230.24 was successful. If it was not successful, the system 20 proceeds to the error processing at 230.46 described above.

If the process at 230.24 was successful, and that success is confirmed at 230.26, the device management object 66 message service thread can be created and started at 230.28. At 230.30, the system 20 determines whether the process at 230.28 was successful. If it was not successful, the system 20 proceeds to the error processing at 230.46 described above.

If the process at 230.28 was successful, and that success is confirmed at 230.30, the list of network devices is retrieved at 230.32. At 230.34, the system 20 determines whether the process at 230.32 was successful. If it was not successful, the system 20 proceeds to the error processing at 230.46 described above.

If the process at 230.32 was successful, and that success is confirmed at 230.34, the list of network devices is processed at 230.36. At 230.38, the system 20 determines whether the process at 230.36 was successful. If it was not successful, the system 20 proceeds to step 230.42, returning a NETWORK_AVAILABLE message, and terminating the initialization process.

If the process at 230.36 was successful, and that success is confirmed at 230.38, the system changes the operation mode to normal at 230.40 and then proceeds to return a message of NETWORK_AVAILABLE before terminating the process at 230.44.

Figure 12:
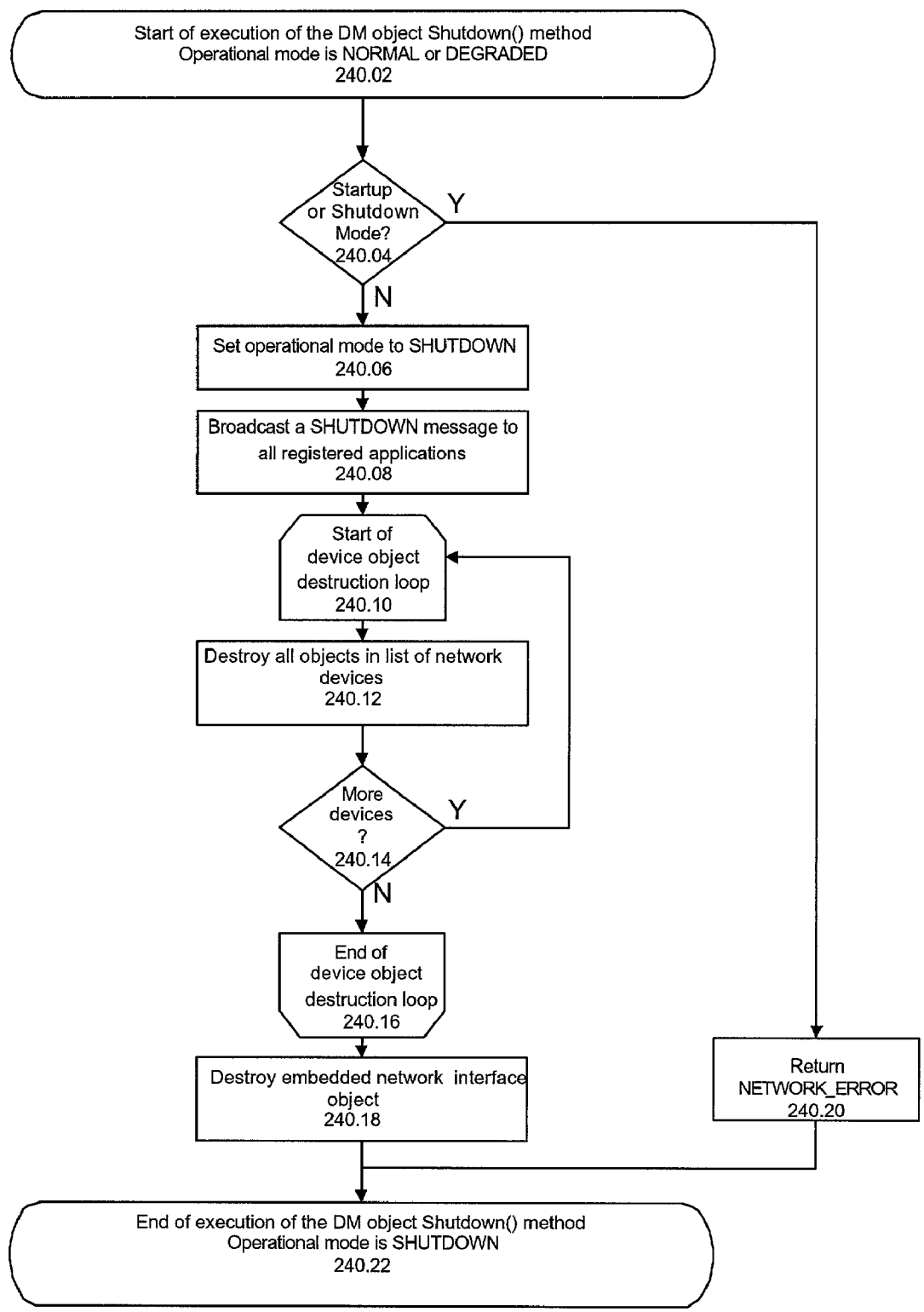
FIG. 12 is a flowchart illustrating the process of shutting down a device management object.

FIG. 12 discloses a flowchart of the shutdown process. The execution of the process is begun at 240.02, with a current operational mode of either normal or degraded. The system 20 checks to see at 240.04 if current mode is either startup or shutdown. If so, the system 20 returns a NETWORK_ERROR message at 240.20, and the process terminates at 240.22.

If the mode at 240.04 is either normal or degraded, the mode is set to shutdown at 240.06. A shutdown broadcast message is sent to all registered user processes 84 and software applications at 240.08. The device destruction begins at 240.10. All objects in the list of network devices are destroyed at 240.12. If some devices continue to exist at 240.14, the destruction loop at 240.10 is repeated. Once no more device objects continue to exist at 240.14, the end of the destruction loop is reached at 240.16. The device management object 66 and the network interface object 70 are destroyed at 240.18, and the shutdown process is completed at 240.22.

Figure 13:
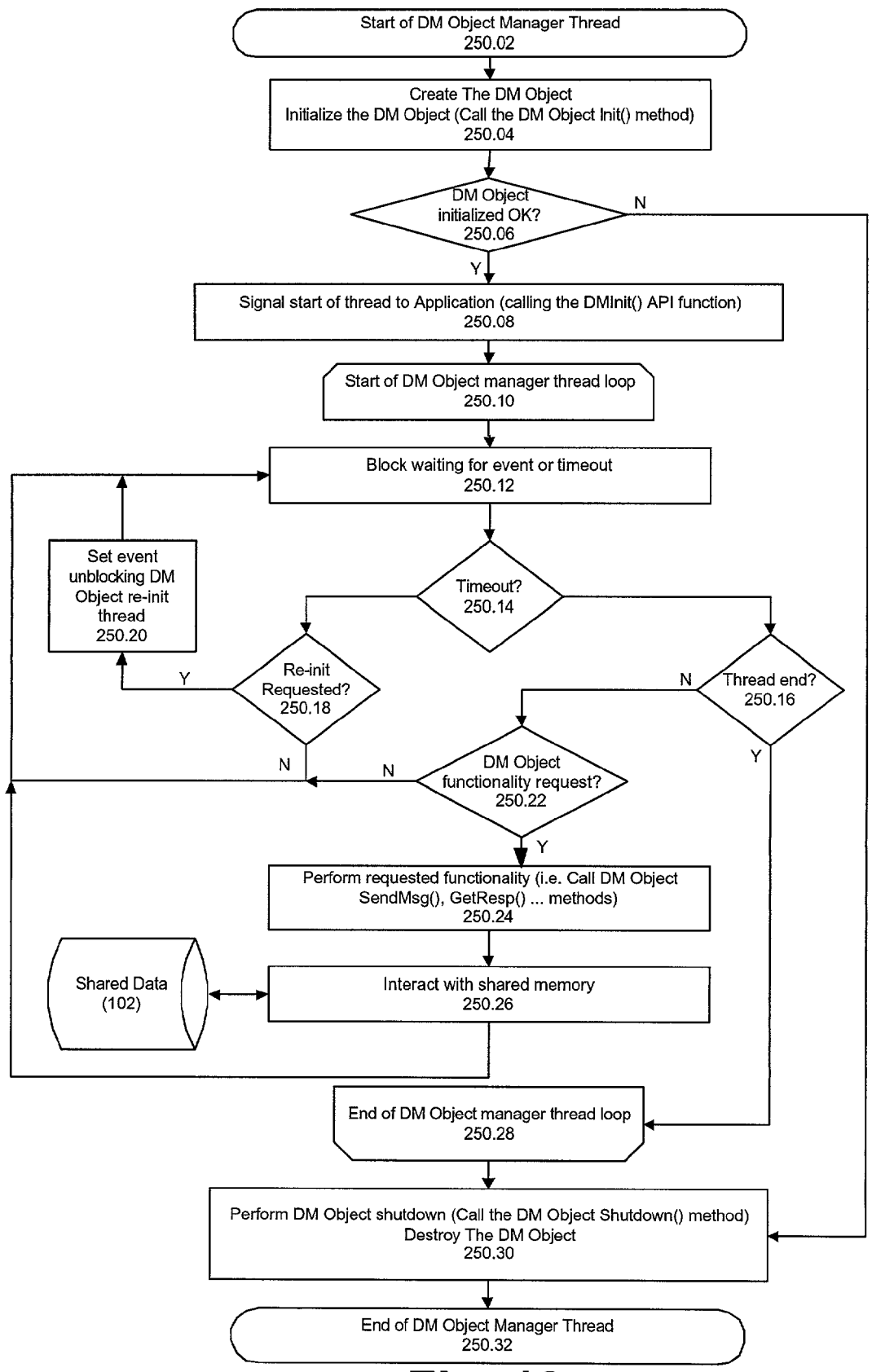
FIG. 13 is a flowchart illustrating the process of a device management object manager thread.

FIG. 13 discloses a flowchart of the DM object manager thread 94. The execution of the thread is started at 250.02. The DM object is created and initialized at 250.04. The successful initialization of the object is tested at 250.06. If the initialization is not successful, the object is destroyed at 250.30 and the execution of the DM object manager thread terminates at 250.32. If the initialization of the object is successful, a signal is sent at 250.08 to the system 20 indicating that the thread has successfully started and the main DM object manager thread loop is started at 250.10. The loop execution blocks at 250.12, waiting for an event that can be set only by a user process 84 or software applications 62, also waiting for a maintenance timer to expire. As soon as the thread is unblocked, the reason of the unblocking is investigated at 250.14. If the reason is a timeout, the status of the re-init request flag is checked at 250.18. If a re-init condition is detected, the event triggering the re-initialization of the DM object is set at 250.20 and the DM object manager thread resumes waiting for an event or timeout as described above. If no re-init condition is detected, the DM object manager thread resumes waiting for an event or timeout as described above. If the reason of the thread unblocking as checked at 250.14 is not a timeout, the thread end condition is checked at 250.16. If the end of the thread has been requested by a user process 84 or software application 62, the DM object manager thread loop ends at 250.28, the DM object is destroyed at 250.30 and the execution of the DM object manager thread terminates at 250.32. If end of the thread has not been requested, a check for a valid DM object functionality request is performed at 250.22. If no valid functionality has been requested, the DM object manager thread resumes waiting for an event or timeout as described above. If a valid DM object functionality has been requested, this functionality is performed at 250.24, then the DM object interacts appropriately with the shared data at 250.26 and the DM object manager thread resumes waiting for an event or timeout as described above.

Figure 14:
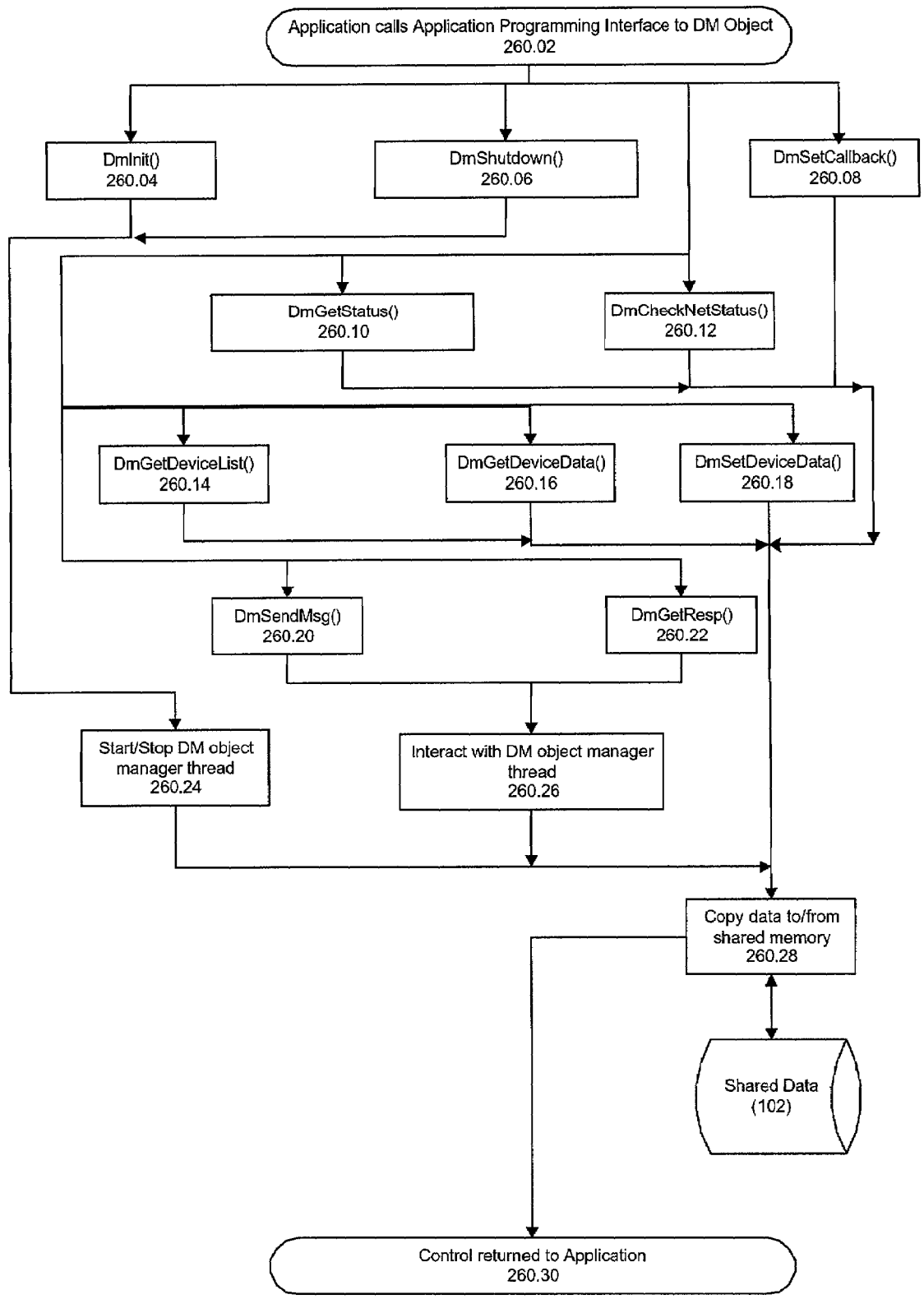
FIG. 14 is a flowchart illustrating the process for executing a device management object interface function.

FIG. 14 discloses the flowchart of the execution of all the API Interface 86 functions as they interact directly or indirectly with the DM object. The functions disclosed in the figure are described in greater detail above. The execution of the API interface function begins at 260.02. Although the functions at 260.04, 260.06, 260.08, 260.10, 260.12, 260.14, 260.16, 260.18, 260.20, and 260.22 are shown in the same flowchart, each of those functions actually has their own path in the figure. In other words, the process at 260.02 is initiated for each of these functions on a one at a time basis.

The DmInit( ) and DmShutdown( ) functions called at 260.02 and 260.04 are used to start the DM object manager thread at 260.24 for DmInit( ), and to stop the DM object manager thread at 260.24 for DmShutdown( ). Each of the two functions then interact appropriately with the shared data at 260.28 and return control to the user process 84 or software application 62 at 260.30.

The DmSendMsg( ) and DmGetResp( ) functions called at 260.20 and 260.22 interact directly with the DM object manager thread at 260.26 by setting events to unblock it and then interact appropriately with the shared data at 260.28 before returning control to the user process 84 or software application 62 at 260.30.

The DmGetStatus( ), DmCheckNetStatus( ), DmSetCallback( ), DmGetDeviceList( ), DmGetDeviceData( ) and DmSetDeviceData( ) functions called at 260.10, 260.12, 260.08, 260.14, 260.16, and 260.18 do not interact with the DM object manager thread but interact solely with the shared data at 260.28 before returning control to the user process 84 or software application 62 at 260.30.

Figure 15:
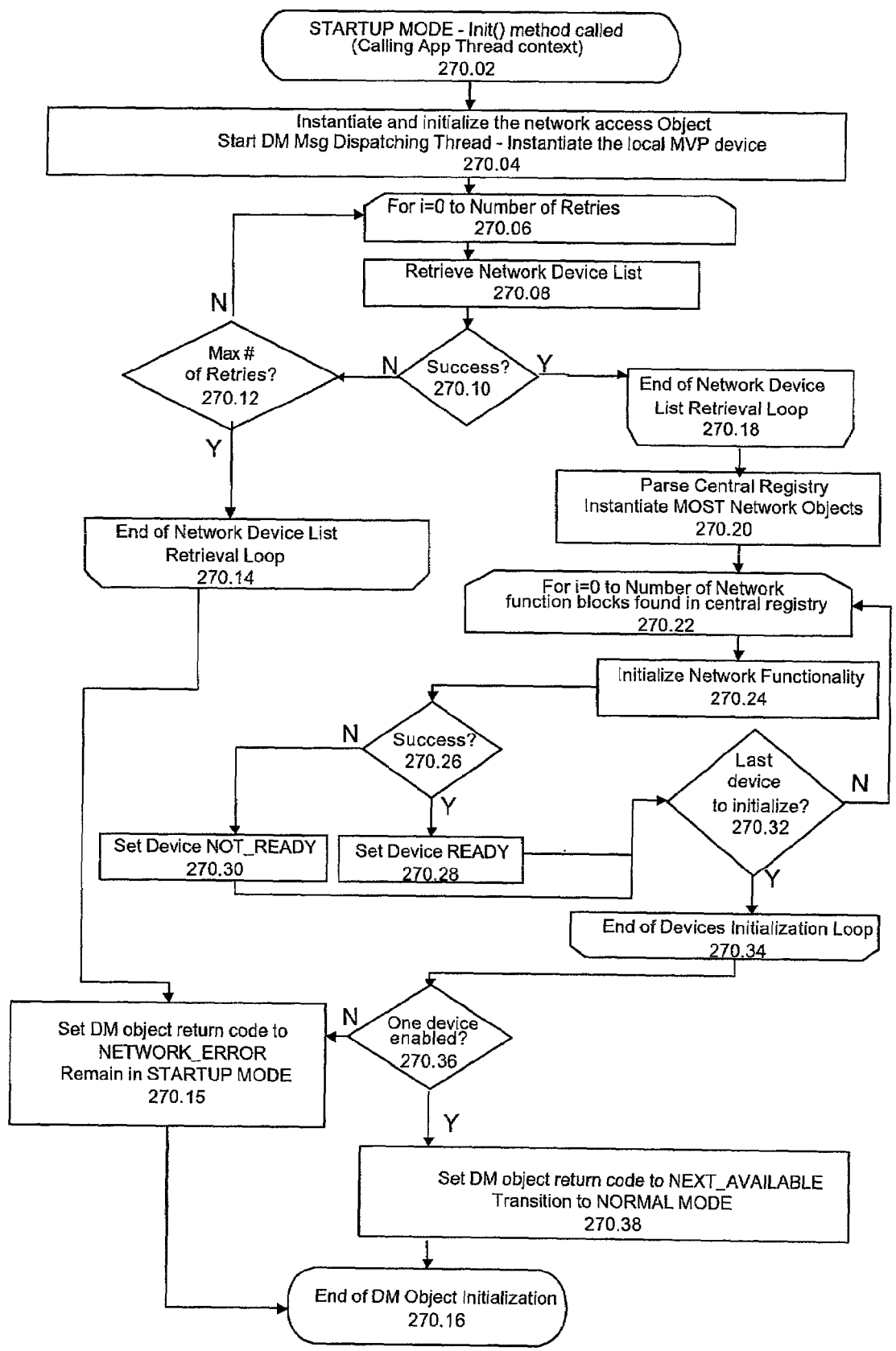
FIG. 15 is a flowchart illustrating the initialization process invoked when the system enters startup mode.

FIG. 15 discloses a startup mode initialization method of the DM object that can be used by the system 20. The process is initiated at 270.02. The network interface 72 is instantiated and initialized at 270.04, drivers for such devices 22 such as MVP (multimedia vehicle platforms).

At 270.06 begins a loop of attempts at retrieving the list of network devices. The list retrieval begins at 270.08. At 270.10 the system 20 determines the success of the retrieval at 270.08. If not successful at 270.10, the system 20 determines at 270.12 whether the maximum number of failures/retries has occurred. If that predetermined number has been exceeded (set by the particular user process 84 or software application 62 in a preferred embodiment), the retrieval loop is ended at 270.14, a NETWORK_ERROR return code is set at 270.15 and the process terminates at 270.16.

If the maximum number of retries at 270.12 has not been exceeded, the loop at 270.06 repeats until the maximum number of retries is exceeded at 270.12, or the process at 270.10 is successful. If success is confirmed at 270.10, the retrieval loop ends at 270.18. The list of network devices can be parsed at 270.20, instantiating objects for the object interface layer 58, including surrogate device objects 68.

A loop begins at 270.22 for all device specific functions found in the list. Network functionality is initialized at 270.24. The success of that initialization attempt is evaluated at 270.26. A successful attempt results in a READY code at 270.28, and an unsuccessful attempt results in a NOT_READY code at 270.30. At 270.32, the system 20 determines whether of the device 22 just initialized was the last device 22 requiring initialization. If not, the loop returns to 270.22, until all devices 22 have been processed by the loop. If the last device 22 is initialized at 270.32, the loop is terminated at 270.34.

If not a single device is enabled at 270.36, a NETWORK_ERROR code is returned at 270.15 and the process terminates at 270.16. If at least one device 22 is enabled at 270.36, a NETWORK_AVAILABLE return code is sent at 270.28, transitioning the mode to normal, and the process ends at 270.16.

Figure 16:
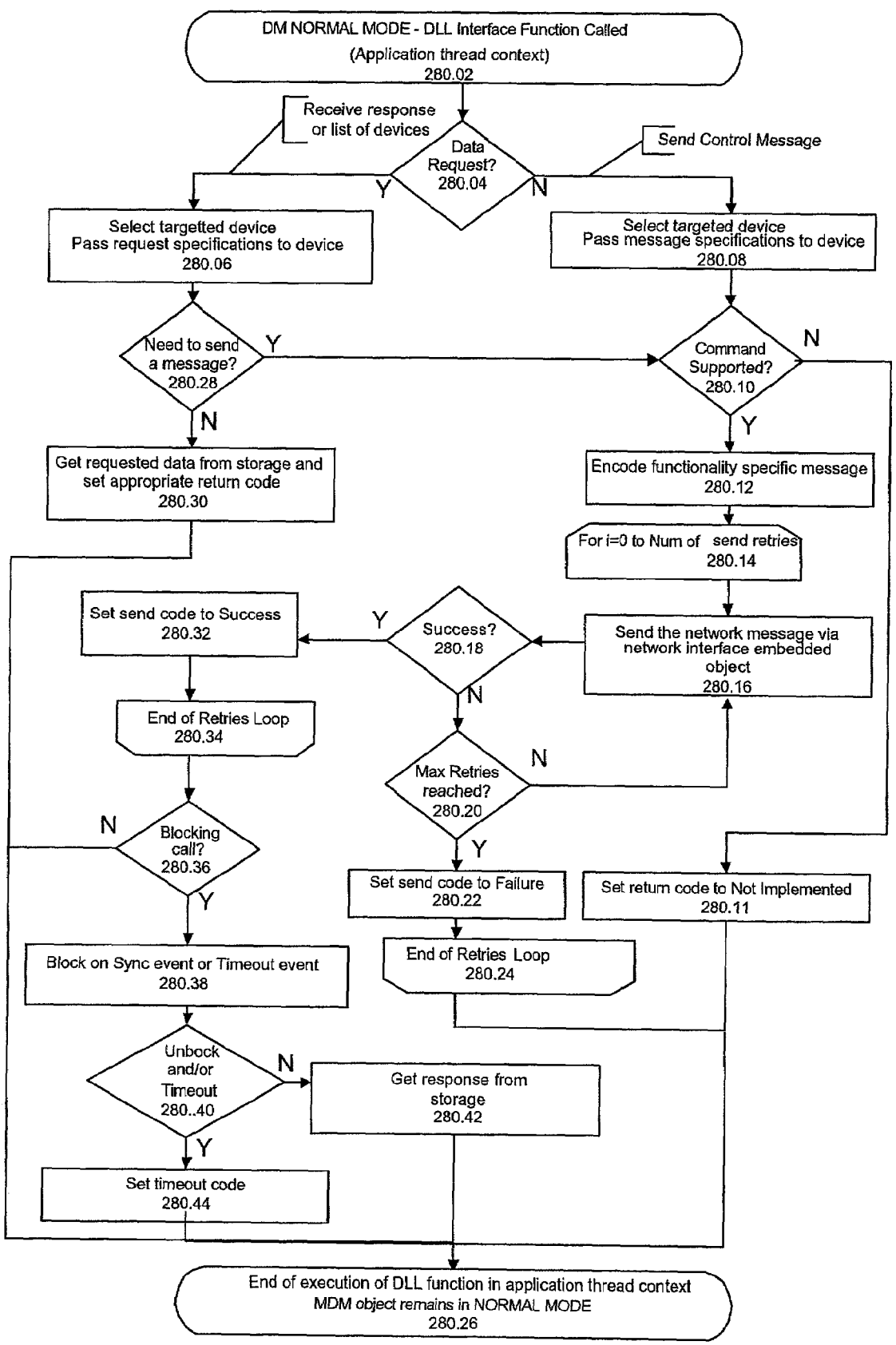
FIG. 16 is a flowchart illustrating the process of calling a DLL interface function while the system is in normal mode.

FIG. 16 is a flowchart illustrating the process of calling an interface function while the system 20 is in a normal mode. The process is initiated at 280.02 by the calling of a function. At 280.04, the system 20 determines whether a data request is being made.

If a data request at 280.04 is not being made, a device control message is sent. That process begins at 280.08 with the selecting of a targeted device, and the passing of message specifications to the device. If the command is not supported at 280.10, the return code of NOT_IMPLEMENTED is sent at 280.11, and the process ends at 280.36. If the command is supported, the specific functionality message is encoded at 280.12. A loop at 280.14 begins to try and send the message up to a permitted number of retries. The network message is sent via network interface object 70 at 280.16. If the message was not successfully sent at 280.18, the system 20 determines at 280.20 if the maximum number of retries has been exceeded. If the maximum number of retries has been exceeded, the retries loop ends at 280.24, and the process ends at 280.26.

The retries loop continues until success is achieved at 280.18, or the maximum number of retries has been exceeded at 280.20. If the sending of the message is ultimately successful at 280.18, the return code of SUCCESS is generated at 280.32, and the retries loop is ended at 280.34. At 280.36, the system 20 determines if there is a blocking call (described in greater detail above). If there is no blocking call at 280.36, the process terminates at 280.26. If there is a blocking call at 280.36, the system 20 waits for a synchronization event or a timeout event at 38. If the delay is too long, a timeout code is set at 280.44, and the process terminates at 280.26. If the delay is not too long, the response from shared data 102 is obtained at 280.42, and the process terminates at 280.26.

If the data request at 280.04 is a received response or a list of devices 22, at 280.06, the targeted devices 22 are selected, and a specifications request is passed to the device 22. At 280.28, the system 20 determines whether there is a need to send a message. If there is a need, the process, continues at 280.10 as described above. If there is nota need, the requested data is obtained from shared data 102 at 280.30, and the appropriate return code is generated.

While the invention has been specifically described in connection with certain specific embodiments thereof, it is to be understood that this is by way of illustration and not of limitation, and the scope of the appended claims should be construed as broadly as the prior art will permit. The subsystems in FIG. 2 and the three layers in FIG. 3 can be incorporated into wide variety of different embodiments, employing a wide variety of different threads, modes functions, and data structures.

What is claimed is:

1. A device management system for managing a plurality of devices connected to a network in a vehicle, said system comprising:

a connectivity subsystem including a device management object, said connectivity subsystem connecting said device management object to said network and said device management object to said plurality of devices;

a discovery subsystem including an identification of said plurality of devices, said discovery subsystem generating said identification from said connectivity subsystem; and a control subsystem, said control subsystem communicating between said plurality of devices and said network with said connectivity subsystem;

wherein said device management object includes a plurality of surrogate device objects, said device management objects being configured to interact with said plurality of devices through said plurality of surrogate device objects, said plurality of surrogate device objects being associated with and implemented externally of said plurality of devices, and said plurality of surrogate device objects are distinct from respective device drivers of said plurality of devices, and wherein said network in a vehicle is an embedded network.

2. The system of claim 1, wherein said device management object comprising a device loading module;

wherein said device loading module supports more than one of said plurality of devices.

3. The system of claim 1, said system including a software application, at least one of said plurality of devices interacting with said device management object through said software application.

4. The system of claim 3, wherein said software application is developed transparently of said network.

5. The system of claim 3, said system further including a plurality of software applications, wherein said plurality of software applications can run on said network at the same time.

6. The system of claim 1, wherein said discovery subsystem automatically generates said identification by analyzing a device characteristic relating to each of said devices in said plurality of devices.

7. The system of claim 1, wherein said discovery subsystem selects one of said surrogate device objects in said plurality of surrogate device objects that corresponds to one of said devices in said plurality of devices, from said plurality of surrogate device objects.

8. The system of claim 7, wherein each said device in said plurality of devices is controlled by a corresponding surrogate device object in said plurality of said surrogate device objects.

9. The system of claim 8, wherein said plurality of surrogate device objects interact with said network through said device management object in at least a substantially simultaneous manner.

10. The system of claim 9, wherein said system can automatically perform a network recovery strategy.

11. The system of claim 10, wherein said network recovery strategy is a passive network recovery strategy.

12. The system of claim 10, wherein said network recovery strategy is an active network recovery strategy.

13. The system of claim 1, said system further comprising a mode selected from the group comprising a startup mode, a normal mode, a shutdown mode, or a degraded mode, wherein said mode is attributed to said device management object.

14. The system of claim 1, said device management object including a dynamic link library, said dynamic link library including:
   an initialization function;
   a get status function;
   a get device list function;
   a set callback function;
   a send message function;
   a get response function;
   a get device data function;
   a set device data function;
   a check network status function; and
   a shutdown function.

15. A method of using a device management object to interface between a plurality of devices and an embedded network located on a vehicle, the method comprising the steps:
   connecting the device management object to the embedded network and to said plurality of devices through a connectivity subsystem;
   identifying the plurality of devices connected to the network with the device management object, wherein device identification is generated by a discovery subsystem from said connectivity subsystem; and
   controlling the plurality of devices through the device management object through a control subsystem, said control subsystem communicating between said plurality of devices and said network with said connectivity subsystem;
   wherein said device management object includes a Plurality of surrogate device objects, said device management objects being configured to interact with said plurality of devices through said plurality of surrogate device objects, said plurality of surrogate device objects being associated with and implemented externally of said plurality of devices, and said plurality of surrogate device objects are distinct from respective device drivers of said plurality of devices.

16. The method of claim 15, further comprising:
   instantiating the device management object; and
   destroying the instantiated device management object.

17. The method of claim 16, further comprising:
   creating a distinct surrogate object for each said device in said plurality of devices,
   wherein each surrogate object is part of said device management object, and wherein said device management object communicates with the plurality of devices through the surrogate objects corresponding to the devices; and
   deleting all surrogate objects.

18. The method of claim 15, further comprising:
   detecting the presence of a new device that is added to the network; and
   creating a surrogate object for the new device.

* * * * *